(12) United States Patent
Brewer et al.

(10) Patent No.: US 11,465,863 B1
(45) Date of Patent: Oct. 11, 2022

(54) SYSTEMS AND METHODS FOR MOVING CONTAINERS BETWEEN VEHICLES AND PLATFORMS

(71) Applicant: Stackloading Services Ltd, Hamilton (BM)

(72) Inventors: John Barrington Brewer, Warwik (BM); Mark Phillip Jordan, Southampton (BM); Connor Rex Burns, Devonshire (BM)

(73) Assignee: STACKLOADING SERVICES LTD., Hamilton (BM)

( * ) Notice: Subject to any disclaimer, the term of this patent is extended or adjusted under 35 U.S.C. 154(b) by 0 days.

(21) Appl. No.: 17/534,952

(22) Filed: Nov. 24, 2021

Related U.S. Application Data

(63) Continuation of application No. 17/472,439, filed on Sep. 10, 2021.

(51) Int. Cl.
| | |
|---|---|
| *B65G 63/00* | (2006.01) |
| *B66C 1/10* | (2006.01) |
| *B63B 25/00* | (2006.01) |
| *B65G 67/60* | (2006.01) |
| *B66C 19/00* | (2006.01) |
| *B63B 27/12* | (2006.01) |

(52) U.S. Cl.
CPC .......... *B65G 63/004* (2013.01); *B63B 25/004* (2013.01); *B63B 27/12* (2013.01); *B65G 67/603* (2013.01); *B66C 1/104* (2013.01); *B66C 19/002* (2013.01)

(58) Field of Classification Search
CPC .. B65G 63/004; B65G 67/603; B63B 25/004; B63B 27/12; B66C 1/104; B66C 19/002
See application file for complete search history.

(56) References Cited

U.S. PATENT DOCUMENTS

| | | | |
|---|---|---|---|
| 3,711,902 A | 1/1973 | Eggert, Jr. | |
| 4,244,615 A * | 1/1981 | Brown ................. | B63B 25/004 294/81.1 |
| 4,950,114 A | 8/1990 | Borchardt | |

(Continued)

FOREIGN PATENT DOCUMENTS

| | | |
|---|---|---|
| CN | 2897961 Y | 5/2007 |
| CN | 101070133 A | 11/2007 |

(Continued)

OTHER PUBLICATIONS

Article "Automation of Ship-to-Shore Container Cranes: A Review of State of the Art", Nenad Zrnic, vol. 22, No. 3, pp. 111-121 Jan. 2005,12 pages.

(Continued)

*Primary Examiner* — Lynn E Schwenning
(74) *Attorney, Agent, or Firm* — Armstrong Teasdale LLP

(57) ABSTRACT

A system is configured to move a group of containers including at least five containers simultaneously between a vehicle and a platform. The system includes a container support frame configured to support the group of containers, at least one hoist, and a conveyor. The at least one hoist is configured to raise and lower the container support frame and the containers when the containers are secured to the container support frame. The conveyor is configured to move the container support frame and the containers between the vehicle and the platform.

32 Claims, 31 Drawing Sheets

(56) References Cited

U.S. PATENT DOCUMENTS

| | | | |
|---|---|---|---|
| 5,718,550 A | 2/1998 | Lanigan, Sr. | |
| 7,073,673 B2 | 7/2006 | Takehara | |
| 7,559,429 B1* | 7/2009 | Ichimura | B66C 1/663 |
| | | | 212/274 |
| 8,118,534 B2* | 2/2012 | Amoss | B65G 67/603 |
| | | | 414/803 |
| 8,408,863 B1* | 4/2013 | Benedict | B63B 27/19 |
| | | | 414/803 |
| 8,469,420 B2* | 6/2013 | Mills | B66C 1/104 |
| | | | 294/81.1 |
| 2004/0028495 A1 | 2/2004 | Tomkins | |
| 2006/0081628 A1* | 4/2006 | D. Myers | B65D 90/08 |
| | | | 220/1.5 |
| 2010/0135742 A1* | 6/2010 | Sain | B65D 90/021 |
| | | | 410/46 |
| 2011/0073595 A1* | 3/2011 | Crane | B65D 88/129 |
| | | | 220/1.5 |

FOREIGN PATENT DOCUMENTS

| | | |
|---|---|---|
| GB | 2574599 A | 12/2019 |
| WO | 0198195 A1 | 12/2001 |
| WO | 03104132 A1 | 12/2003 |
| WO | 2004002870 A1 | 1/2004 |
| WO | 2010007514 A2 | 1/2010 |
| WO | 2011008200 A1 | 1/2011 |
| WO | 2017064449 A1 | 4/2017 |
| WO | 2018150153 A1 | 8/2018 |

OTHER PUBLICATIONS

Article, "Anti-Sway Control of Container Cranes: Inclinometer, Observer, and State Feedback", Yong-Seok Kim, vol. 2, No. 4, pp. 435-499, Dec. 2004, 15 pages.

* cited by examiner

SYSTEMS AND METHODS FOR MOVING CONTAINERS BETWEEN VEHICLES AND PLATFORMS

CROSS-REFERENCE TO RELATED APPLICATIONS

This application is a continuation of U.S. Non-provisional application Ser. No. 17/472,439, filed Sep. 10, 2021, the entire contents and disclosures of which are hereby incorporated herein by reference in its entirety.

BACKGROUND

The present disclosure relates generally to systems for moving containers and, more particularly, to a system and method for simultaneously moving a group or cluster of containers either from a vehicle to a platform or from a platform to a vehicle.

Containers are used when transporting objects via vehicles such as ships, trains, or trucks. The containers are durable, modular, and can hold large and small objects during transport. Typically, the containers are loaded onto the vehicles in rows (called racks). For example, each rack may include 20 or more containers. A single vehicle may carry hundreds of racks having thousands of containers. Typically, the containers are transferred between the vehicle and a platform (e.g., a dock) by a crane that raises each container and moves the container between the vehicle and the platform. The crane also moves each container from the dock and onto the vehicle.

However, typically the crane individually transfers each container between the vehicle and the platform. Moving thousands of containers onto or off of a vehicle, such as a ship using current crane technology and systems takes days to complete. The protracted container loading and unloading process increases the cost and time required to transport the containers. Some cranes can support two, three, or even four containers. For example, some cranes support two, three, or four containers that are arranged in a vertically aligned arrangement, one container above another. However, the forces on the cranes are increased when multiple containers are moved, and conventional cranes may not be capable of handling the increased forces created by the increased container loads. For example, wind, gravity, momentum forces, and load shifts can cause the containers to shift (e.g., sway, twist, or turn) as the crane moves the containers and can limit the crane's ability to control movement of the containers. Uncontrolled movement of the containers can cause damage to equipment and possibly injure people. In addition, the containers can be difficult to properly locate on the vehicle or platform when the containers are moved between the vehicle and platform by the crane.

Therefore, there is a need for a system to effectively move groups of containers quickly and safely between a vehicle and a platform.

SUMMARY

In one aspect, a system for moving containers between a vehicle and a platform includes a container support frame including a first end, a second end, and at least one structural member extending from the first end to the second end. The container support frame has a longitudinal axis extending through the first end and the second end. The system also includes connector housings arranged between the first end and the second end. The container support frame is configured to support a group of containers secured to the container support frame at the connector housings. The group of containers includes at least five containers. The system further includes at least one hoist and a conveyor. The at least one hoist is configured to raise and lower the container support frame and the containers when the containers are secured to the container support frame. The conveyor is configured to move the container support frame and the containers between the vehicle and the platform.

In another aspect, a method for moving containers between a vehicle and a platform includes securing a group of containers to a container support frame and raising, using a hoist, the container support frame and the group of containers above the platform and the vehicle. The group of containers include at least five containers. The method also includes moving the container support frame and the at least five containers between the platform and the vehicle, and lowering, using the hoist, the at least five containers onto the platform or the vehicle.

In yet another aspect, a system includes a container support frame configured to engage a group of containers in a row on a platform or a vehicle. The group of containers include at least five containers. The container support frame includes connector housings that are arranged to secure the containers in the row to the container support frame. The system also includes a hoist configured to raise and lower the container support frame and the containers, and a conveyor configured to move the container support frame and the containers between the platform and the vehicle.

In still another aspect, a system for moving containers between a ship and a platform is provided. The ship includes a cargo space having a width sized to receive a group of containers. The group of containers includes five to twenty five containers arranged to span the width of the cargo space. The system is configured to secure to and support the group of containers and move the group of containers between the ship and the platform.

BRIEF DESCRIPTION OF THE DRAWINGS

Corresponding reference characters indicate corresponding parts throughout the several views of the drawings.

DETAILED DESCRIPTION

Figure 1:
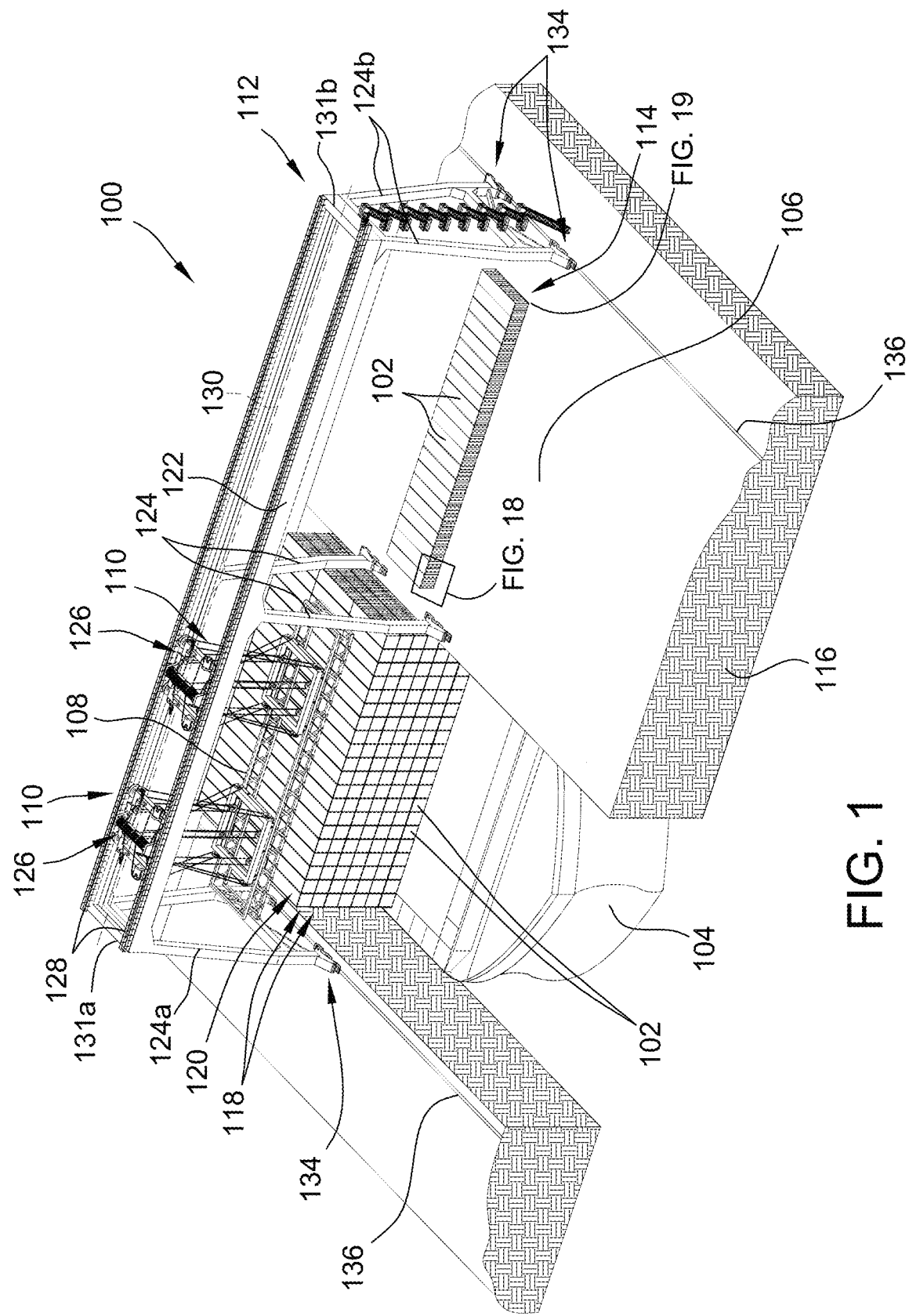
FIG. 1 is a perspective view of an embodiment of a system for moving containers between a vehicle and a platform, the system including a hoist, a conveyor, and a container support frame.
Figure 2:
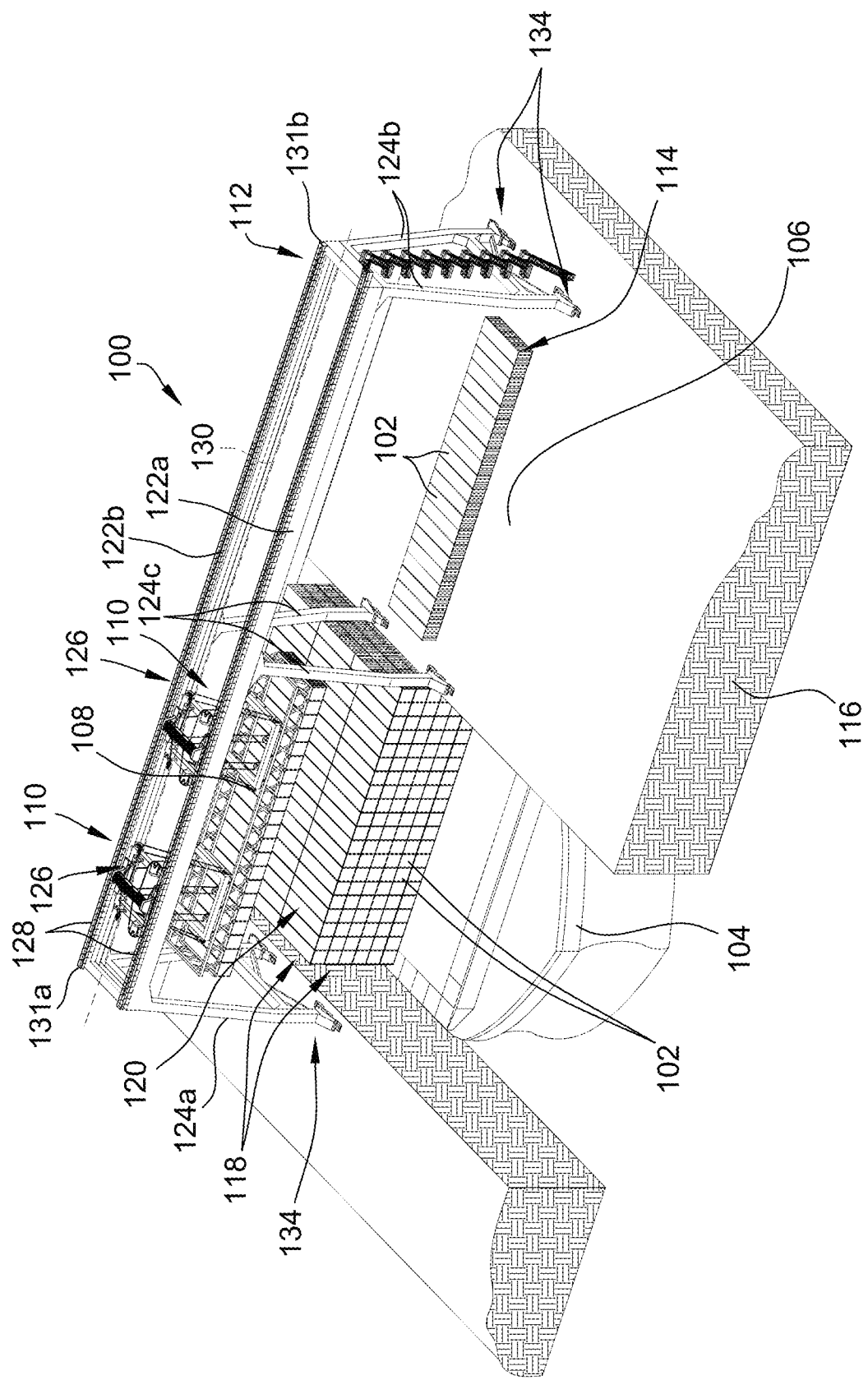
FIG. 2 is a perspective view of the system of FIG. 1 with the hoist in a raised position and containers secured to the container support frame above the vehicle.
Figure 3:
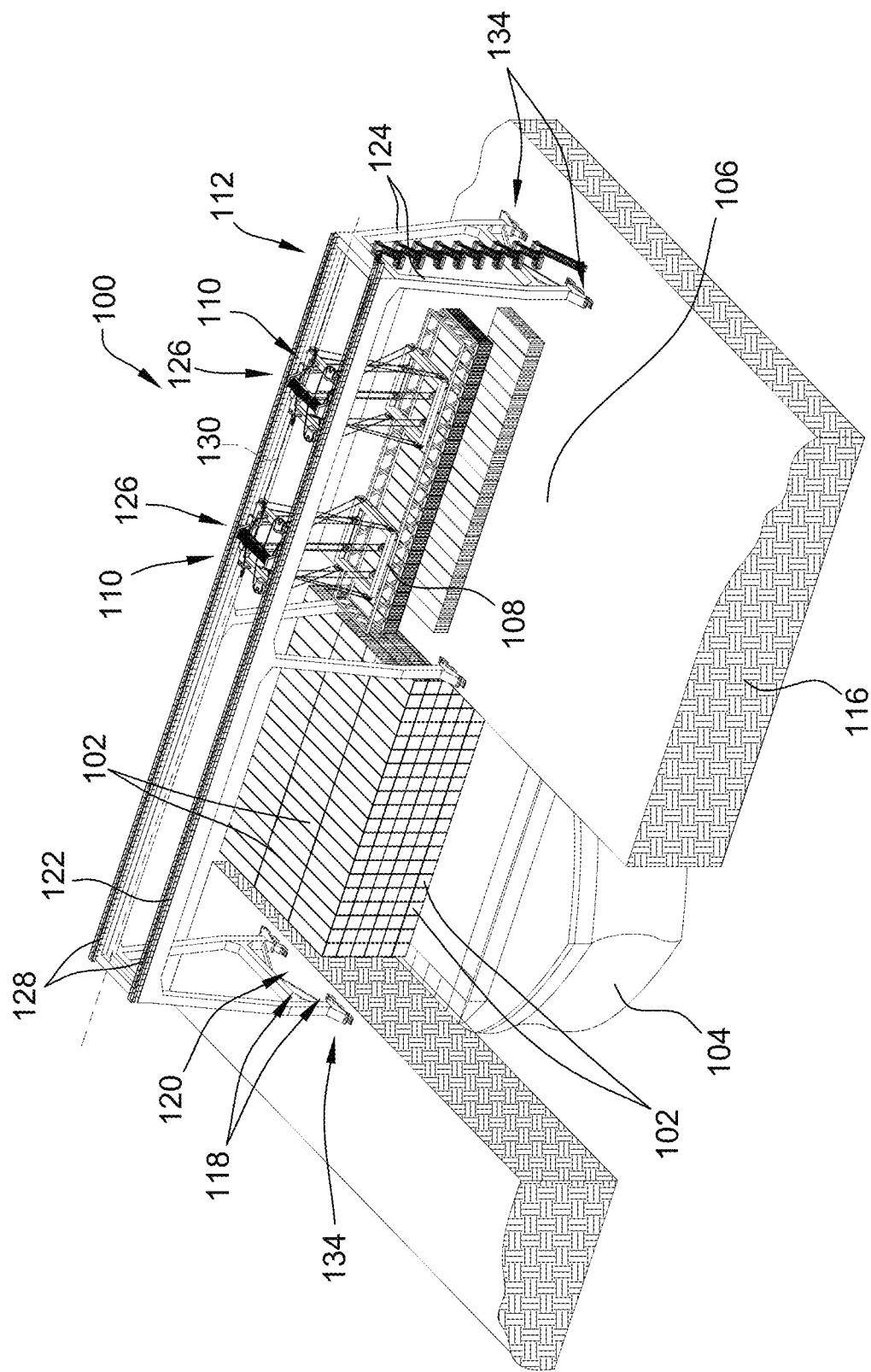
FIG. 3 is a perspective view of the system of FIG. 1 with the hoist in a lowered position and the containers secured to the container support frame above the platform.
Figure 4:
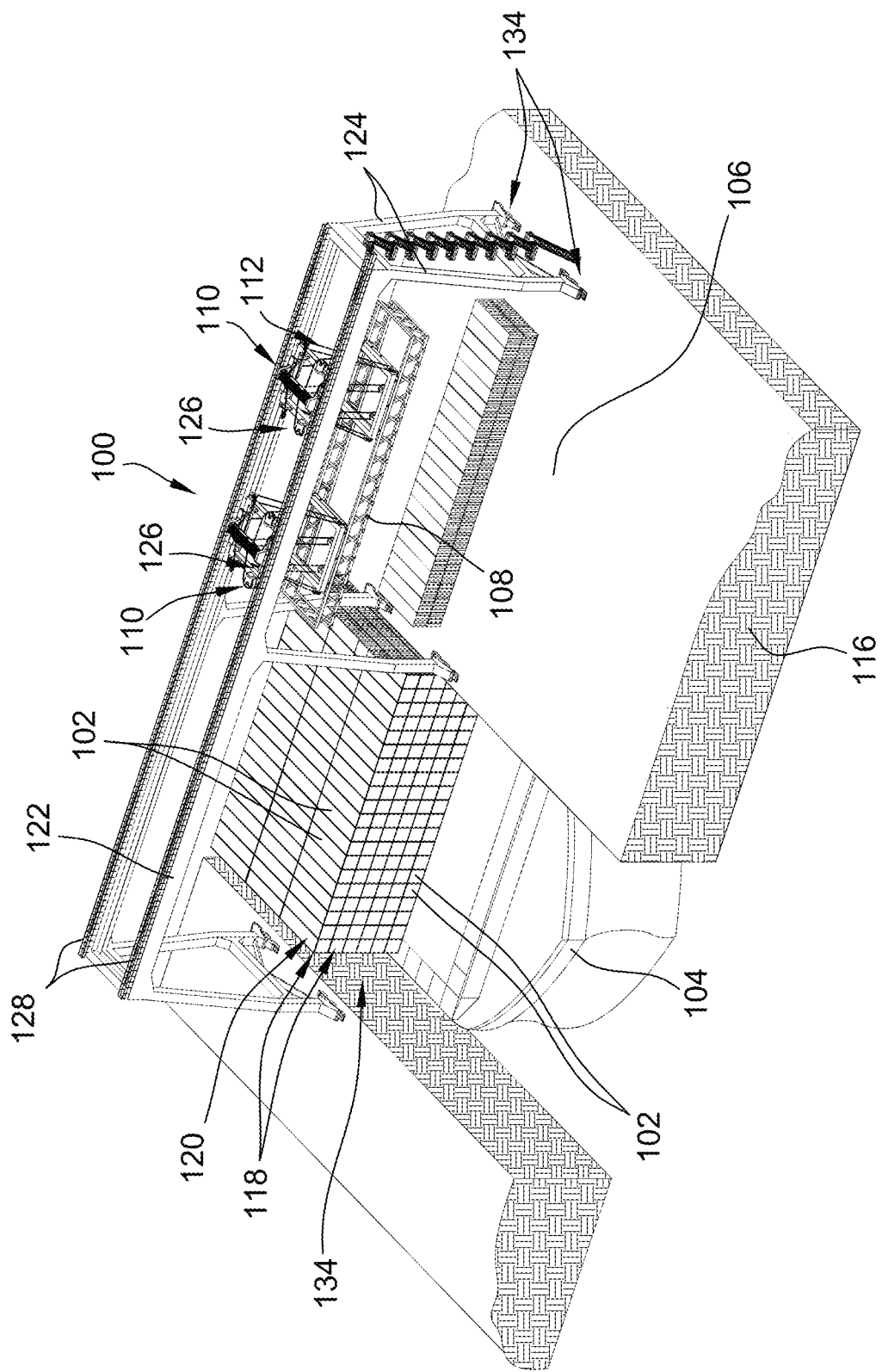
FIG. 4 is a perspective view of the system of FIG. 1 with the hoist in a raised position and the container support frame ready to receive additional containers to move between the vehicle and the platform.

Referring now to the drawings, and in particular to FIGS. 1-6, a system 100 for moving containers 102 between a vehicle 104 and a platform 106 generally includes a container support frame 108, a hoist, broadly a moving system, 110, a conveyor 112, and an alignment system 114. For example, in the illustrated embodiment, vehicle 104 is a ship (e.g., an ocean-borne transport). In some embodiments, vehicle 104 may be a train, an automobile, an aircraft, and/or any other suitable vehicle. System 100 is configured to load containers 102 onto vehicle 104 from platform 106 or unload containers 102 from vehicle 104 onto platform 106. For example, in the illustrated embodiment, platform 106 is located at a quay or dock 116. In some embodiments, platform 106 is located at a shipping depot, a train station, or any other suitable location.

Containers 102 are any suitable containers. For example, in the illustrated embodiment, containers 102 are conventional shipping or intermodal containers. Containers 102 are rectangular cuboids and have a length of approximately 20 feet (feet (ft))(6.1 meters (m)) or 40 ft (12.2 m) and a width of approximately 8 ft (2.4 m). Containers 102 are constructed of a metal such as steel.

As shown in FIGS. 1-6, system 100 is configured to simultaneously move a group of containers. As shown in the FIGS. 1-6 in the illustrated embodiment the group comprises a plurality of containers aligned side-by-side in a row or rack 118. For the example, row 118 includes typically 5-25 of the containers. The group of containers moved onto vehicle 104 comprises a plurality of containers that spans a width of the ship. For example, the vehicle 104 includes a cargo space 107 with a width 105 that is sized to receive the group of containers. In the illustrated embodiment, the width 105 of the cargo ship is equal to the width of the ship. For example, the cargo space 107 may be a hold define by the hull of the ship and/or a platform on a deck of the ship. The containers are positioned in the cargo space 107 on the ship. In this way, the ship is loaded and unloaded quickly and efficiently. Although a row is disclosed, in some embodiments, the group of containers may comprise different load configurations not specifically described herein. In the illustrated embodiment, each row 118 includes twenty-one containers 102. Rows 118 may include more or less than twenty-one containers 102 without departing from aspects of the disclosure. System 100 picks up rows 118 of containers 102 and moves the containers between vehicle 104 and platform 106. System 100 is configured to support rows of the containers and counteract forces on the container rows during movement of the containers. As a result, system 100 moves containers 102 between the vehicle and the platform more efficiently and in less time than the same container load is able to be completely moved using conventional systems.

Moreover, system 100 picks up rows 118 from stacked arrangement 120 and sets down the rows of the containers into stacked arrangement 120 that is suitable for transport on vehicle 104 or for storing on platform 106. Accordingly, system 100 does not require containers 102 to be rearranged prior to or after the system moves the containers between the vehicle and the platform.

Conveyor 112 is configured to move empty container support frame 108 or container support frame 108 and containers 102 secured to container support frame 108 between vehicle 104 and platform 106. For example, conveyor 112 includes a boom comprising boom members 122a, 122b, legs 124, and trolleys 126. Boom members 122a, 122b are parallel to each other and extend between, and are supported by legs 124. The boom has a longitudinal axis 130 and spans across the width of vehicle 104 and platform 106 as shown in FIG. 1. Boom members 122a, 122b include tracks 128 extending in the direction of the longitudinal axis 130 and are adapted to enable movement of trolleys 126 in longitudinal direction 130 between ends 131a and 131b of boom members 122a and 122b. Each trolley 126 includes wheels 132 and at least one drive motor (not shown) drivingly connected to wheels 132. Trolleys 126 are configured to move along tracks 128 between the vehicle 104 and the platform 106. Although two trolleys are disclosed, any suitable number of trolleys may be used to effectively move the container support frame and containers.

In the illustrated embodiment, conveyor 112 includes six legs 124. Pairs of legs 124a, 124b are located at respective ends 131a, 131b of booms 122a, 122b and oriented to form an A-frame type structure at the boom ends. A third pair of legs 124c is located midspan of the booms between the boom ends. In use, in the exemplary embodiment, the midspan legs are located on the platform as shown in FIG. 1. Legs 124 each include wheel assemblies 134 at the ends of the legs and the wheels are configured to move along tracks 136 extending along the length of platform 106. For example, tracks 136 are located on quay 116. Conveyor 112 includes motors (not shown) that are drivingly connected to the wheel assemblies to control movement of conveyor 112 along the length of platform 106.

Figure 5:
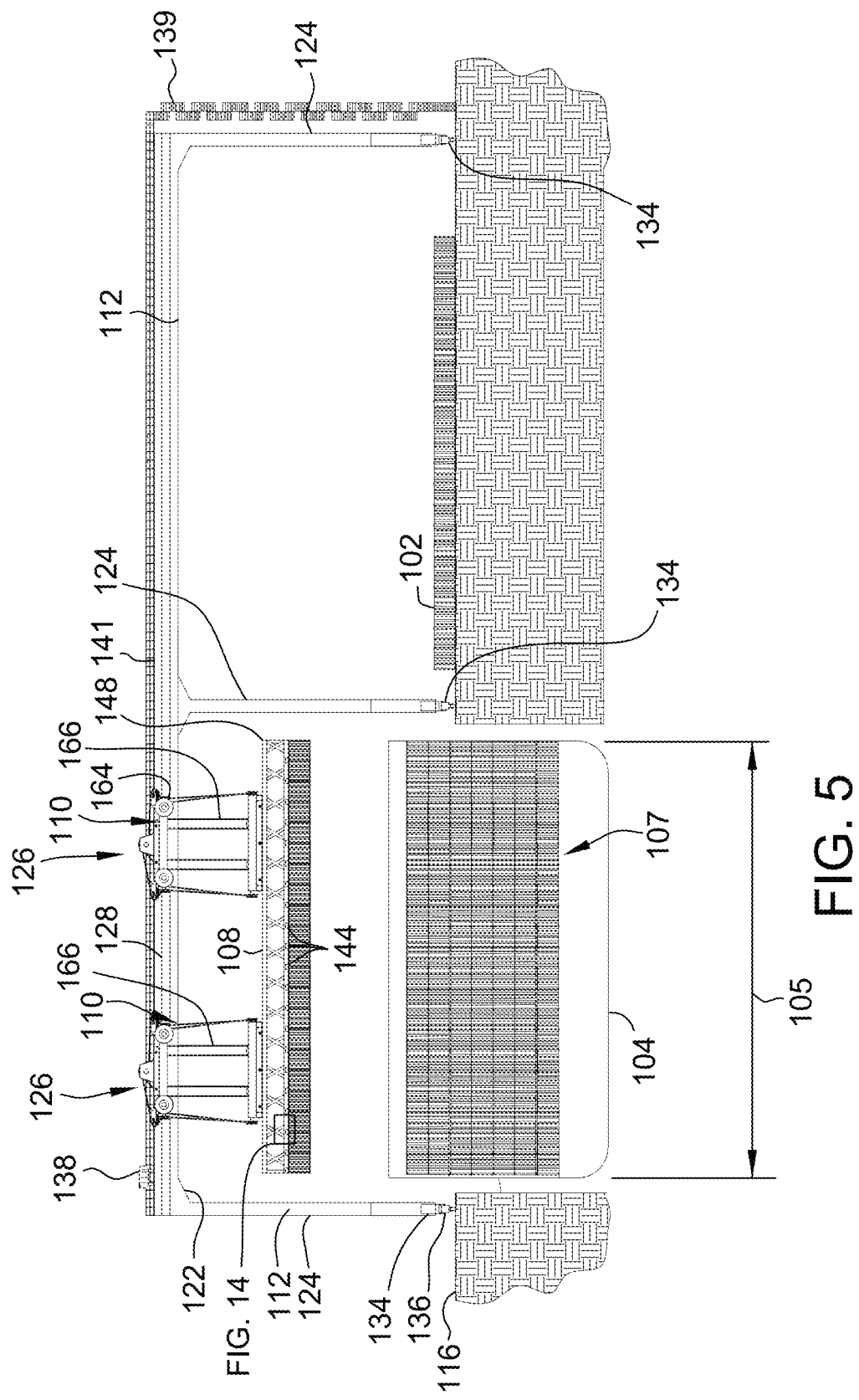
FIG. 5 is a front elevation view the system of FIG. 1 with the hoist in a raised position and the containers secured to the container support frame above the vehicle, a portion of the vehicle being omitted to illustrate the containers on the vehicle.
Figure 6:
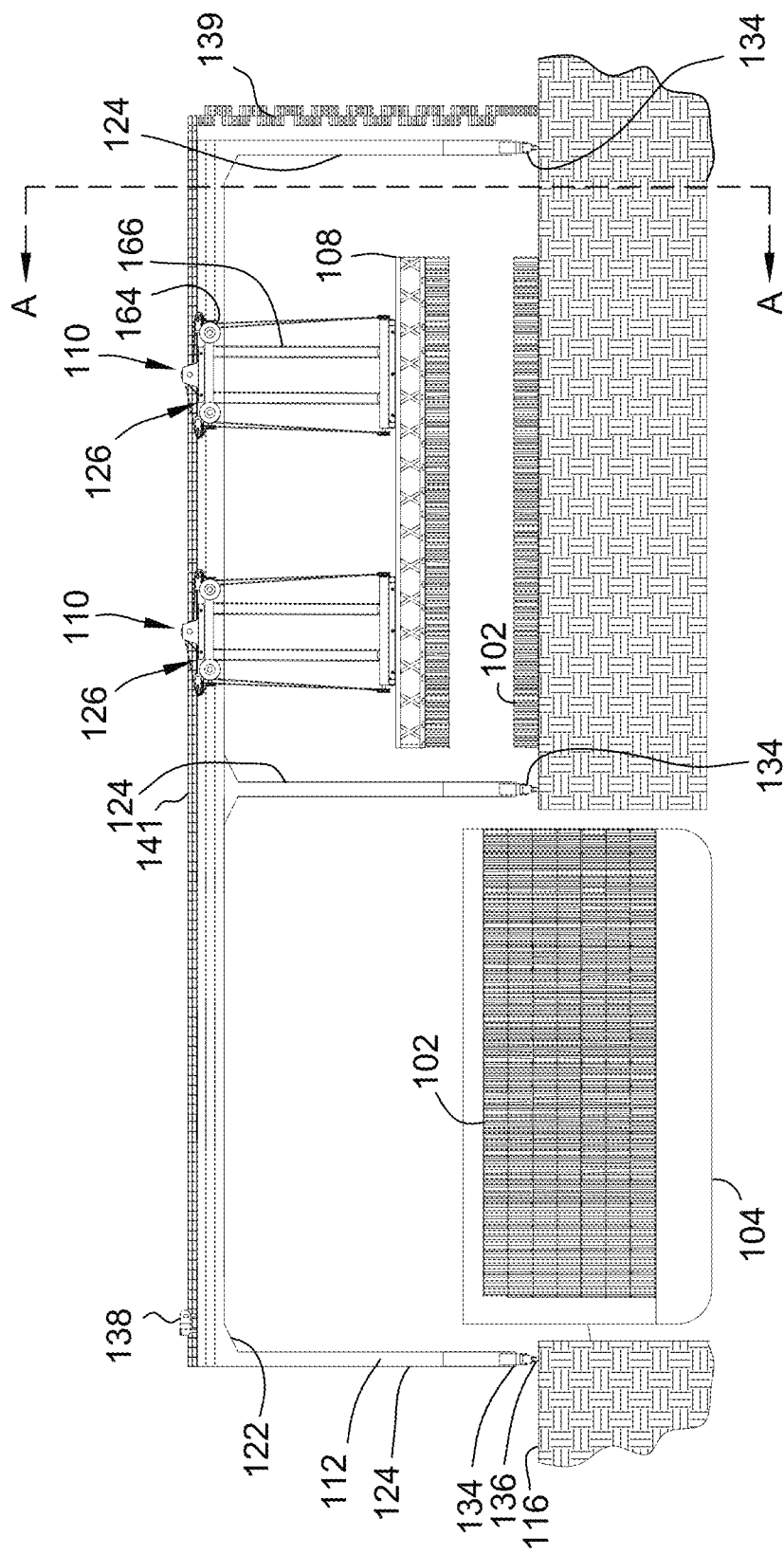
FIG. 6 is a front elevation view of the system of FIG. 1 with the hoist in a lowered position and the containers secured to the container support frame above the platform.

As shown in FIGS. 5 and 6, system 100 includes a cab 138 located on boom 122 of the conveyor 112. Cab 138 includes any control systems, electronic and communication equipment, and operator interfaces suitable for an operator to control system 100. For example, an operator controls conveyor 112 and hoist 110 from cab 138. The control systems within the cab are communicatively connected to and configured to send control signals to at least hoist 110 and conveyor 112. System 100 may include sensors such as cameras (not shown) positioned around the system to provide the operator within cab 138 feedback during system operation. In some embodiments, system 100 is operated at least in part remotely. In further embodiments, the system has control systems configured to operate the system at least in part autonomously.

Figure 7:
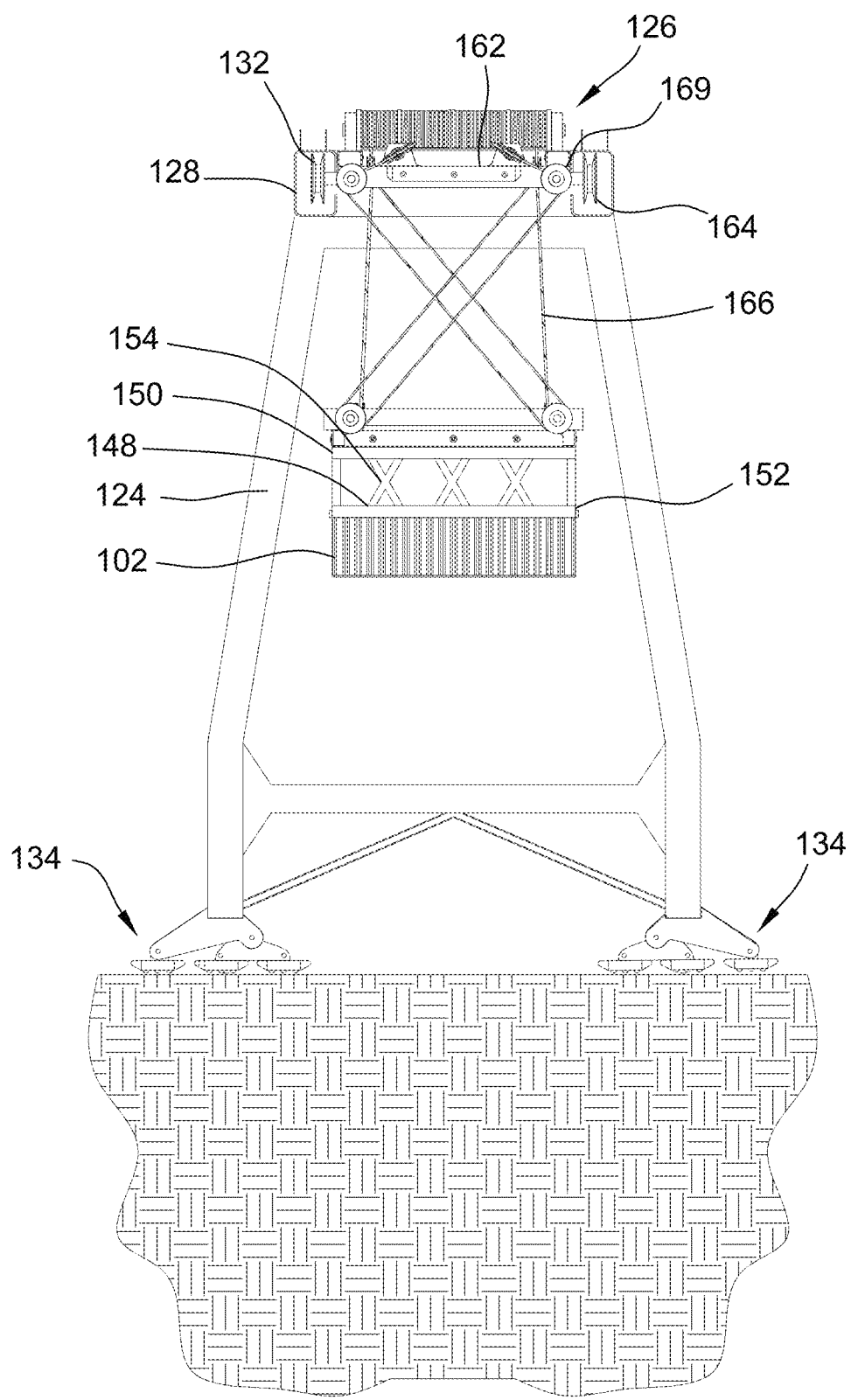
FIG. 7 is a sectional view of a portion of the system of FIG. 1 taken along line A-A in FIG. 6, with the hoist in a raised position.
Figure 8:
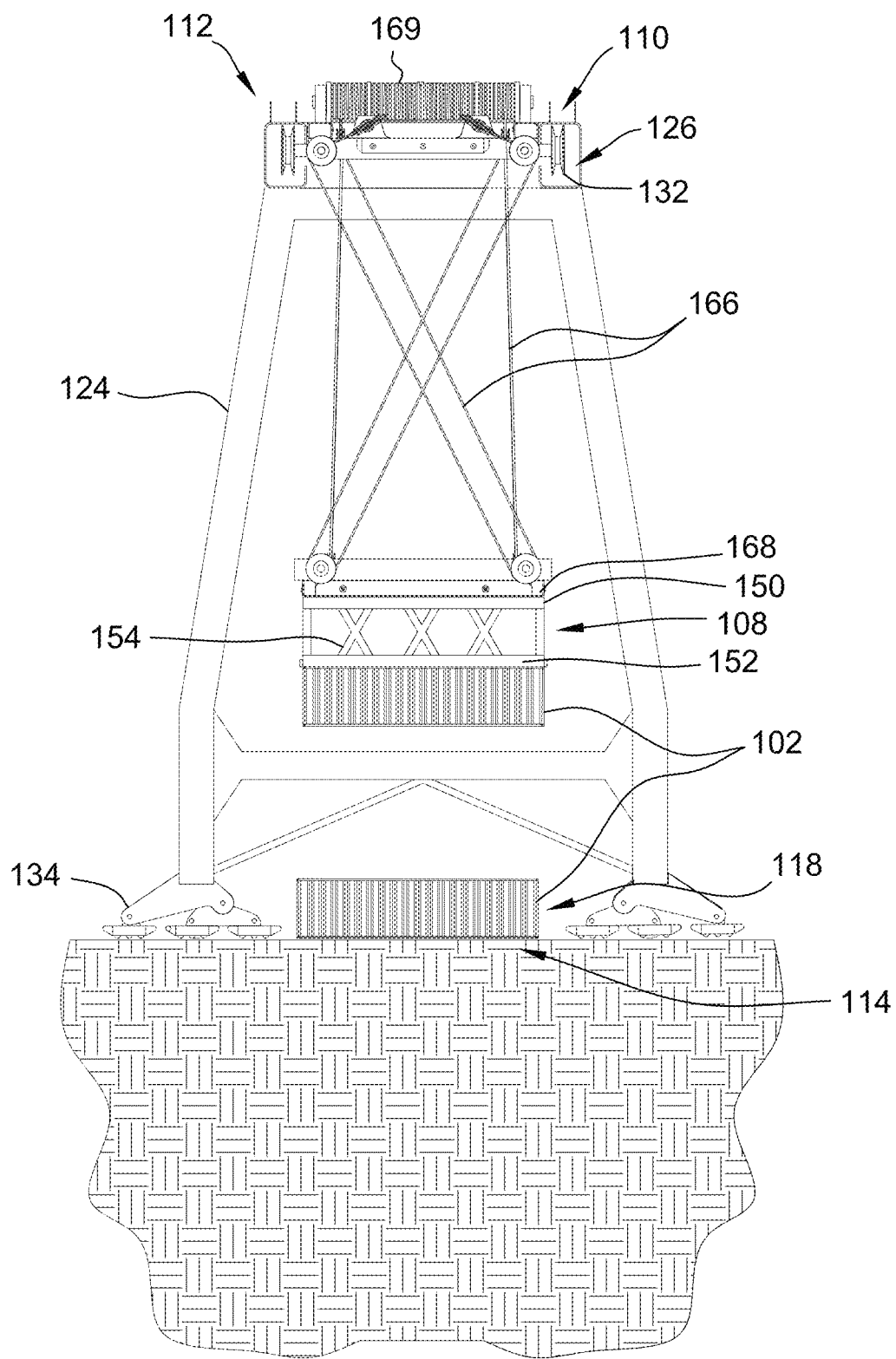
FIG. 8 is a sectional view of a portion of the system of FIG. 1 taken along line A-A in FIG. 6, with the hoist in a lowered position.
Figure 9:
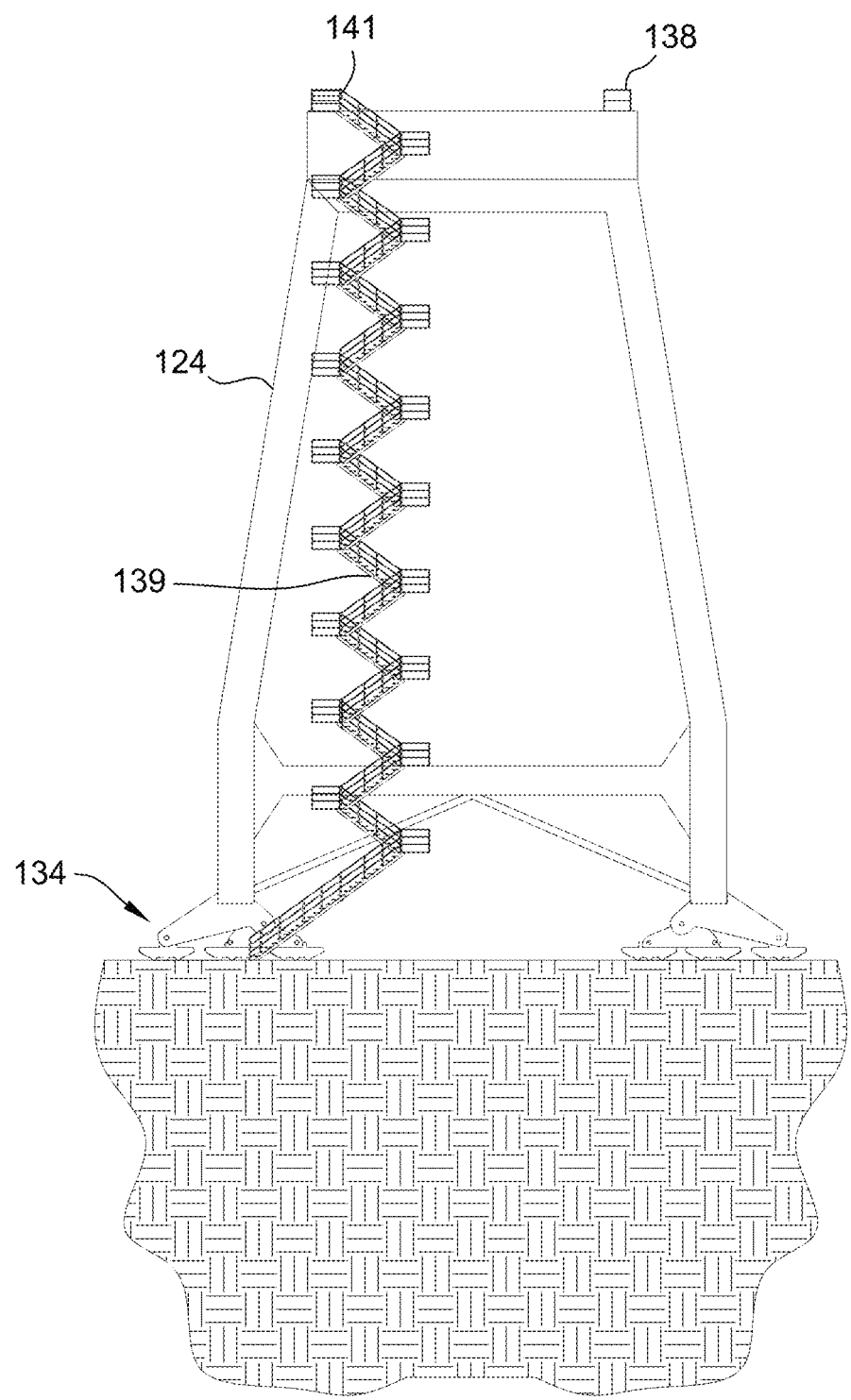
FIG. 9 is an end view of a portion of the system of FIG. 1, illustrating stairs on the system.
Figure 10:
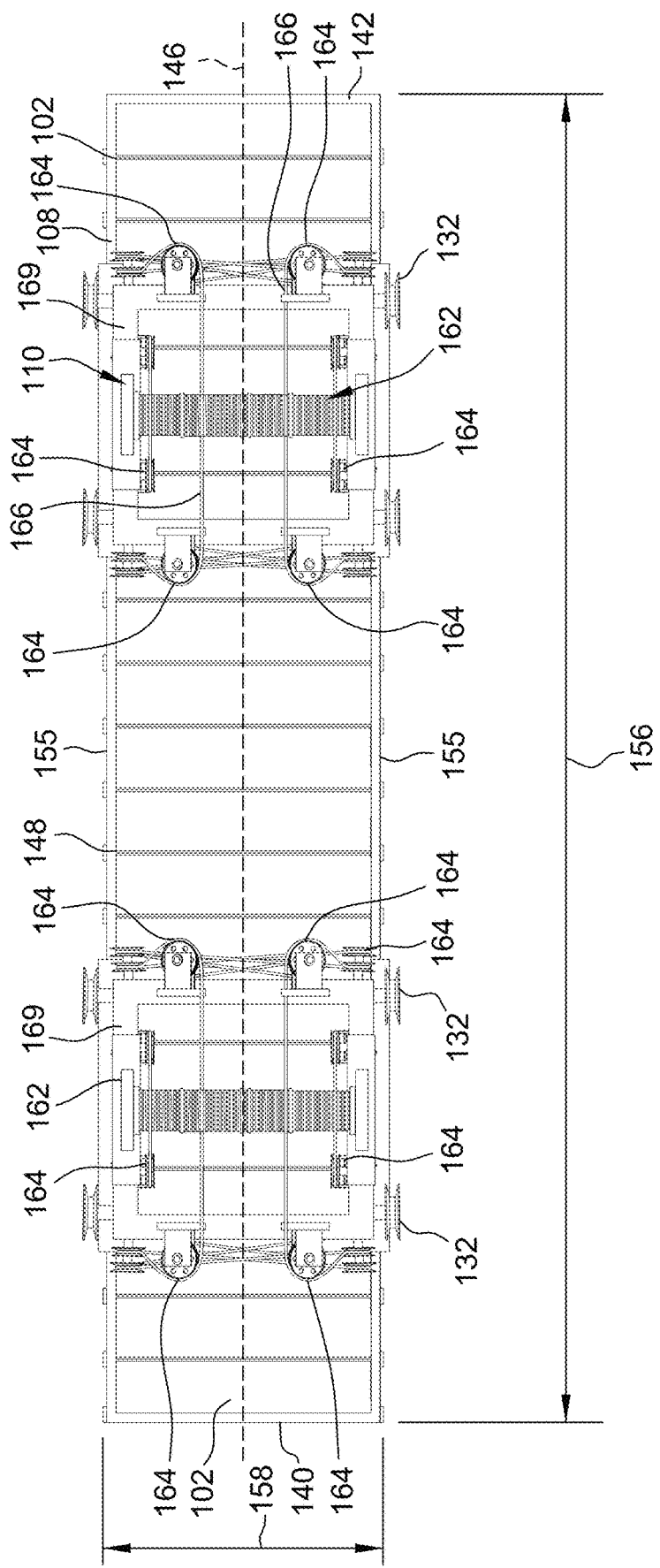
FIG. 10 is a top view of a portion of the system of FIG. 1, illustrating the hoist and the container support frame.

Referring to FIGS. 7-9, system 100 is accessible for personnel to inspect, maintain, and operate. For example, system 100 includes stairs 139 extending along one of the pairs of legs 124a, b of conveyor 112 from the platform to the top of boom 122a, b. In addition, the system includes one or more walkways 141 for personnel to traverse the conveyor. An operator can access the booms 122a, b and cab 138 using stairs 139 and walkways 141.

Referring to FIGS. 10-13, container support frame 108 includes a first end 140, a second end 142, and connectors 144 that secure discrete containers 102 to the container support frame. Container support frame 108 has a longitudinal axis 146 extending through the first and second ends. Connectors 144 are arranged between first end 140 and second end 142. Container support frame 108 is configured to support a group of containers comprising a group of containers 102 (e.g., five to twenty five containers) secured to the container support frame by connectors 144.

In the illustrated embodiment, container support frame 108 comprises a plurality of structural members 148 forming an open lattice. For example, structural members 148 extend in at least three different directions and are arranged to resist bending and twisting/torsional forces imparted on the container support frame 108 as the container support frame and the group of containers are moved by hoist 110 and conveyor 112 (shown in FIG. 1). Structural members 148 include a top 150, a bottom 152, and cross-bracing 154. Cross-bracing 154 extends between top 150 and bottom 152 at angles relative to both the top and bottom members and forms sides 155 of the container support frame. The structural members extend between first end 140 and second end 142 and around a perimeter of the container support frame to form a hollow rectangular cuboid shape. As a result, structural members 148 provide strength for container support frame 108 and enable the container support frame 108 to be relatively light in weight and simpler to assemble than other frames.

The container support frame has a length 156 defined as the linear distance between first end 140 and second end 142, and also comprises a width 158 defined as the linear distance between support frame sides 155. Length 156 is greater than or equal to the cumulative width of at least five of the containers 102. For example, using the standard dimensions of the exemplary container provided herein, length 156 of support frame 108 is at least 40 ft (12.2 m). In the illustrated embodiment, the length is approximately 172 ft (52.4 m). In addition, the width is greater than or equal to the length of containers 102. For example, width 158 is at least 20 ft (6.1 m) or at least 40 ft (12.2 m). In the illustrated embodiment, width 158 is approximately 20 ft. (6.1 m). In other embodiments, container support frame 108 may be other sizes without departing from some aspects of the disclosure. For example, in some embodiments, width 158 is less than the length of containers 102.

Figure 11:
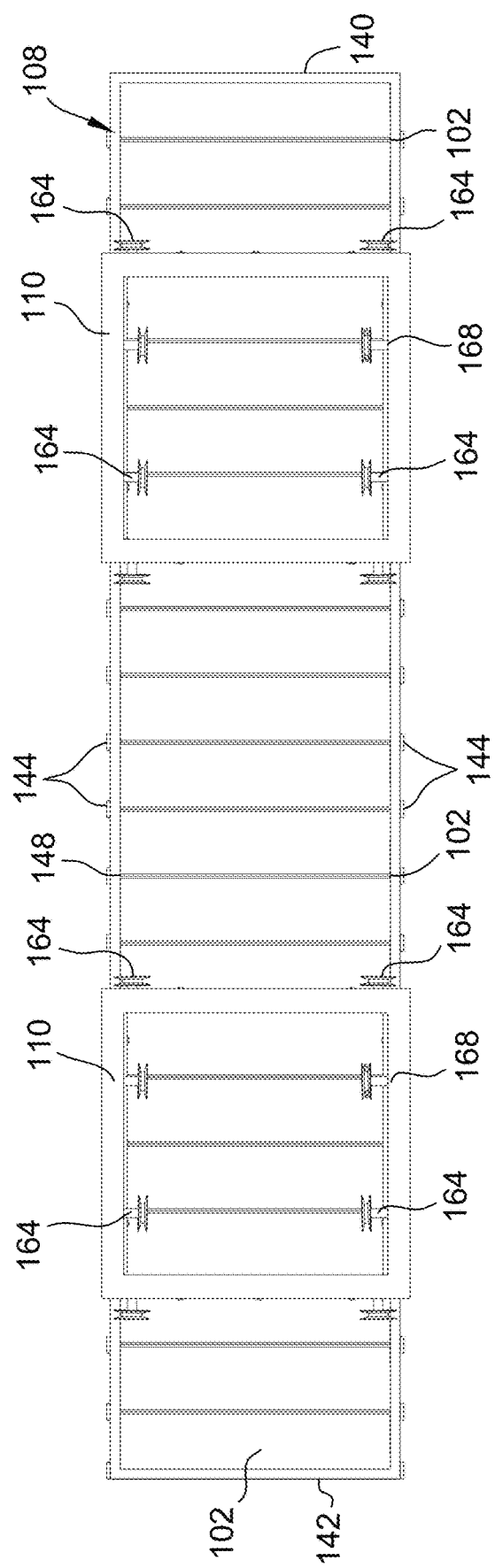
FIG. 11 is a top view of a portion of the system of FIG. 1 with a top portion of the hoist being omitted.
Figure 12:
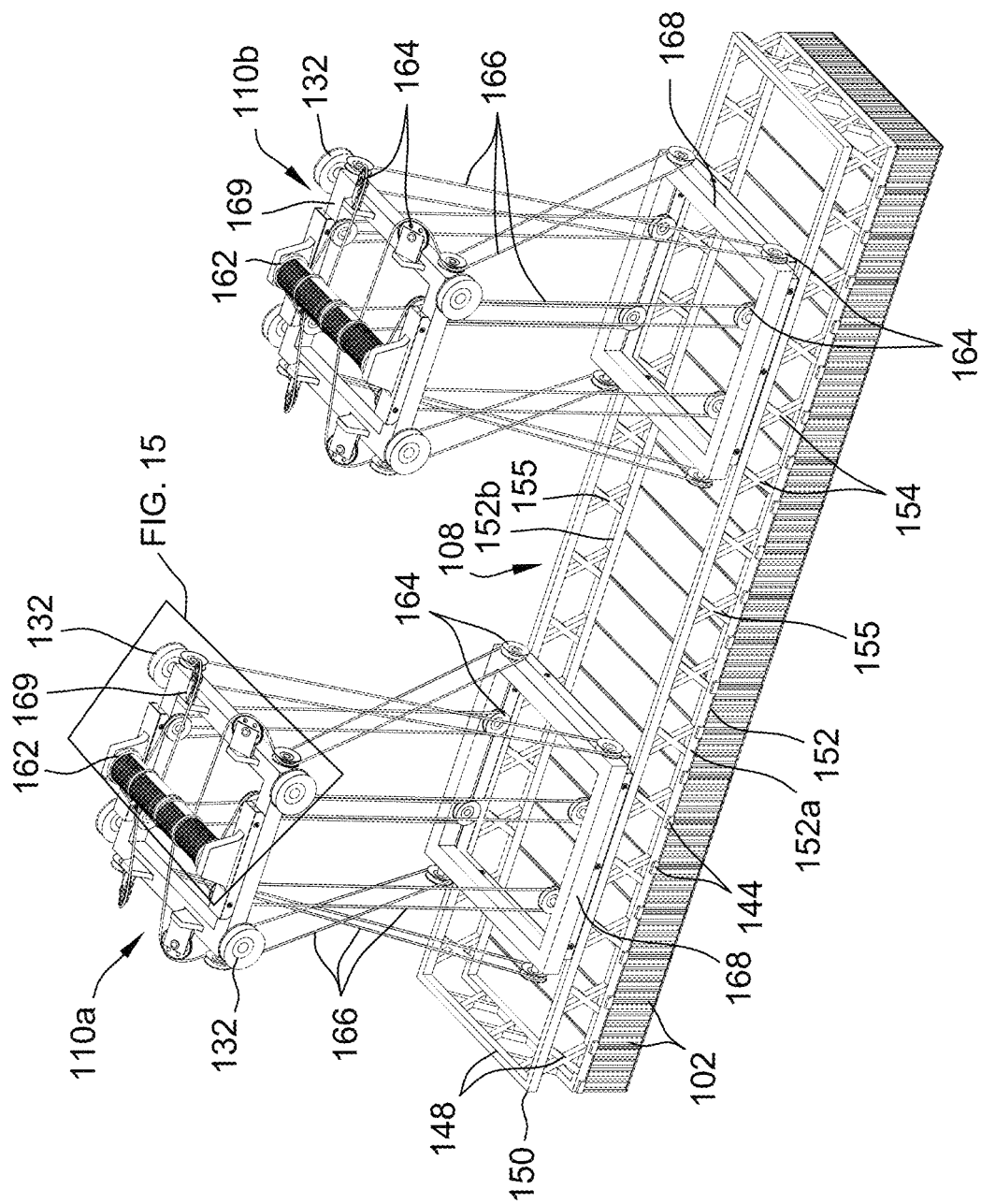
FIG. 12 is a perspective view of the portion of the system of FIG. 1 with the hoist in a lowered position.
Figure 13:
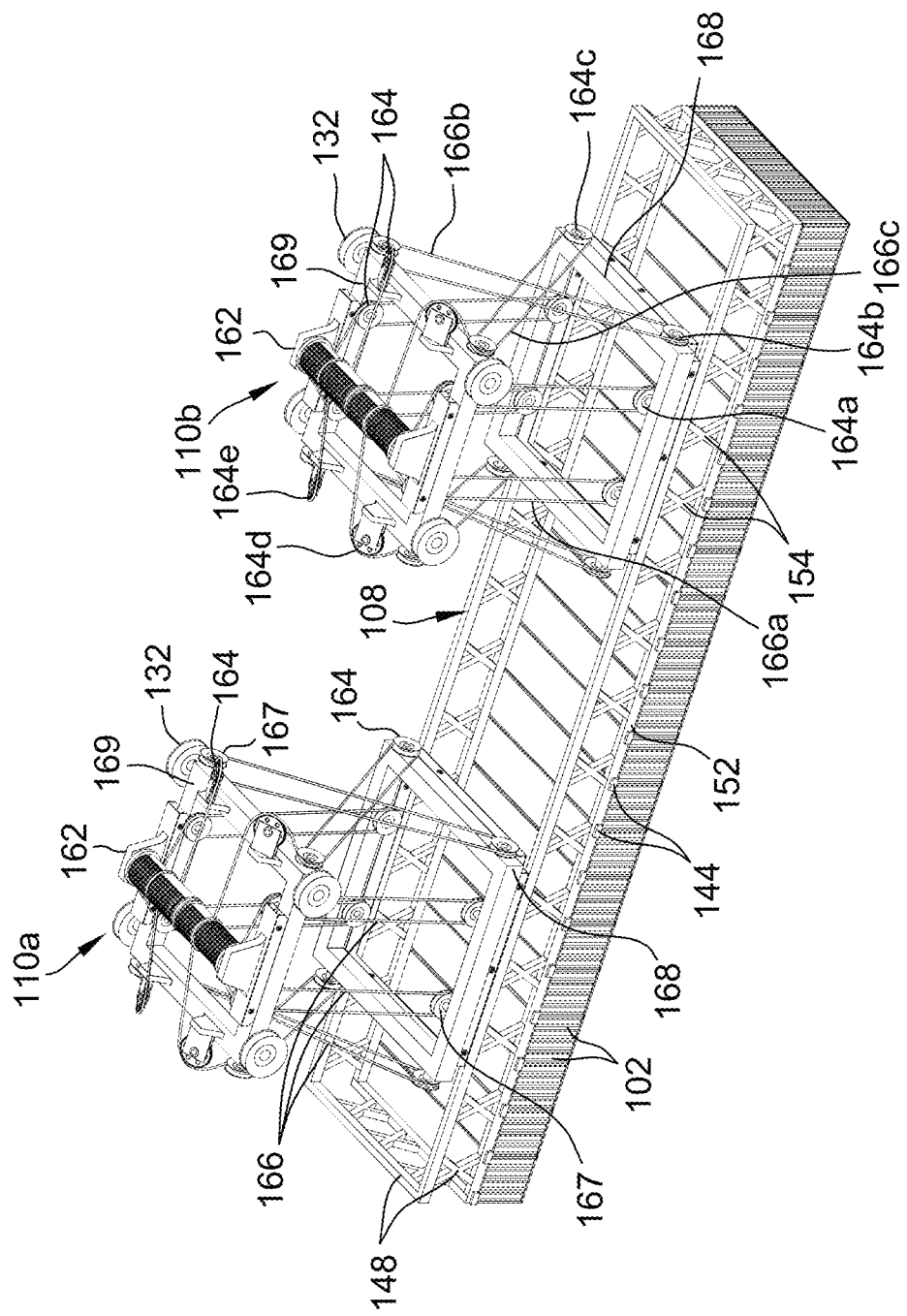
FIG. 13 is a perspective view of the portion of the system of FIGS. 1 and 12 with the hoist in a raised position.

Connectors 144 are mounted along bottom 152 of the container support frame and configured to secure the containers to the container support frame along the frame bottom 152. The containers are supported below the container support frame as hoist 110 raises and lowers the container support frame. The connectors are arranged in sets with each set being associated with discrete containers 102. For example, as shown in FIG. 11, connectors 144 are arranged in sets of four and are configured so that each connecter engages one of four container corners. Each set of four connectors includes two connectors at a longitudinal position along bottom member 152a and two connectors located along the opposite bottom member 152b at a similar longitudinal position. As a result, the set of four connectors are positioned to engage the container corners. In the illustrated embodiment, each set of connectors 144 is configured to engage at least one container 102. For example, each set of the connectors 144 is configured to engage four corners of one container 102 and the immediately adjacent two corners of containers on either side of the container 102. Accordingly, the containers are secured to container support frame 108 in an aligned, side by side arrangement that corresponds with rows 118 of containers 102 on platform 106 and vehicle 104. As a result, container support frame 108 is able to directly pick up a group of containers and set down the containers in the rows without the need to rearrange the containers. Moreover, in the illustrated embodiment, container support frame 108 is configured to pick up rows 118 comprising groups of containers 102 where rows 118 include a full group of side-by-side containers and all of the connectors are engaged with at least one container, or a group of containers where one or more or the connector sets are not engaged with at least one container.

Figure 14:
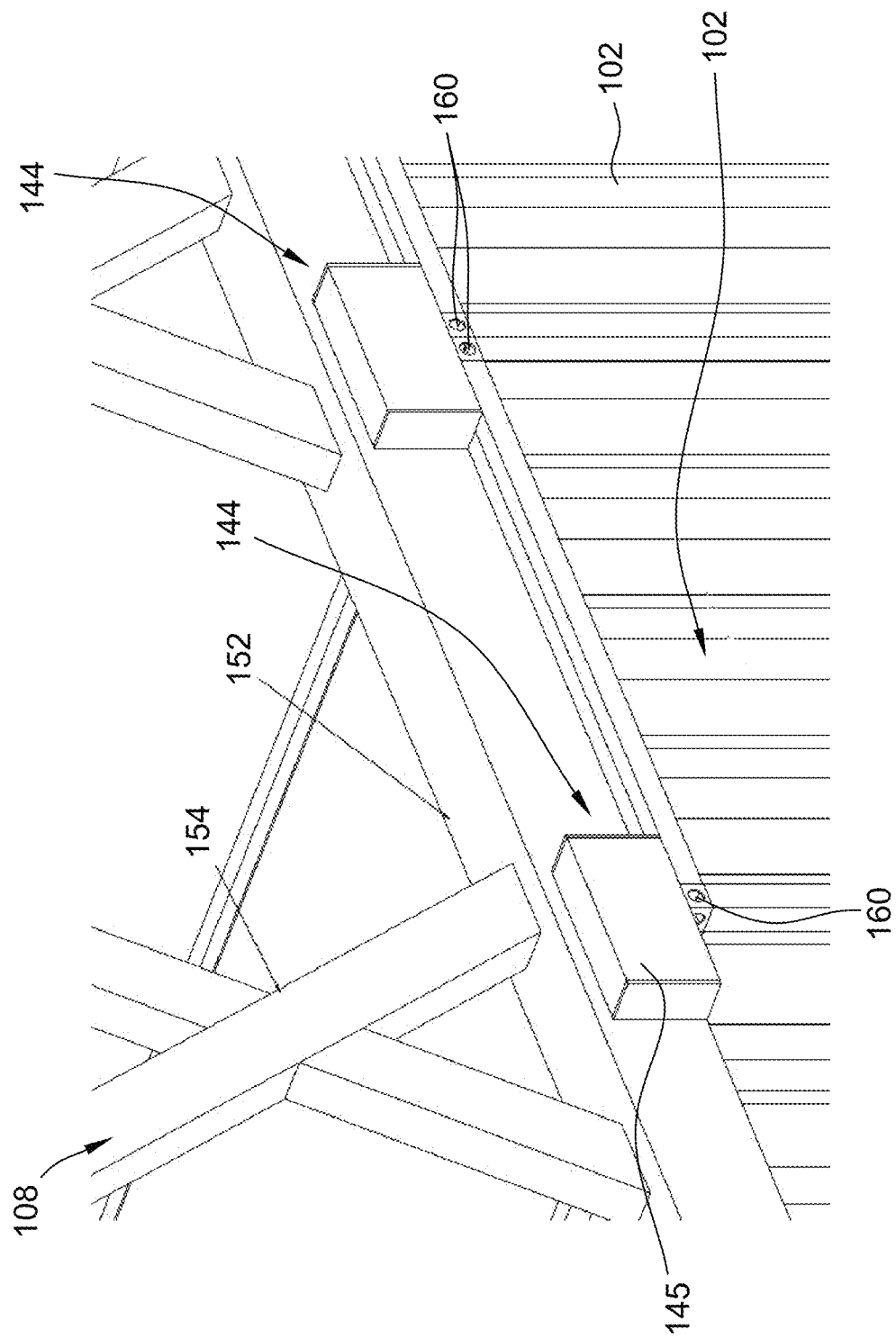
FIG. 14 is an enlarged perspective view of a portion of the system shown in FIG. 5 within the rectangle identified as "FIG. 14" in FIG. 5, illustrating connectors of the system.

Referring to FIG. 14, connectors 144 include housings 145 and rotatable locking mechanisms (not shown) that extend into twist lock mechanisms 160 on containers 102. The rotatable locking mechanisms may be any conventional rotatable locking mechanisms. Such rotatable locking mechanisms are commonly used with containers and persons of ordinary skill in the art would readily understand use of the rotatable locking mechanisms for the present disclosure. The rotatable locking mechanisms may be at least partly contained within the housings 145. Connectors 144 may be positioned between an unlocked position and a locked position. In the locked position, the connectors engage the containers. In the illustrated embodiment, each connector 144 includes two or more locking mechanisms for engaging the containers. In some embodiments, connectors 144 are controlled by an operator located, for example, in cab 138. In further embodiments, connectors 144 operate at least partly autonomously and engage containers 102 when the containers are in proximity to the connectors. The connectors utilize existing connection points on the containers. For example, in the locked position, connectors 144 engage twist lock mechanisms 160 on containers 102. As a result, system 100 is usable with existing containers 102 without having to modify the container structure. Moreover, the connectors provide a secure and simple to use means for attaching the containers to the frame and are easy to maintain and resistant to damage. Connectors 144 utilize conventional twist lock technology and connection points on containers that are well known in the field. Accordingly, additional details of operation of connectors 144 are not necessary for a complete understanding of the disclosure. In other embodiments, the system uses other connectors without departing from some aspects of the disclosure.

Referring to FIGS. 7, 8, 12, and 13, in the illustrated embodiment, system 100 includes two hoists 110a, 110b configured to raise and lower container support frame 108 and containers 102 secured to the container support frame. Each hoist 110a, 110b includes a drum 162, reeving blocks 164, cables 166, and a mounting frame 168. Hoists 110a and 110b are the same. Therefore, "hoist 110" will be used to describe structure and functionality of each hoist 110a, 110b. Container support frame 108 is attached to the mounting frames 168. Trolleys 126 each include upper support frame 169 that is configured to support at least a portion of hoists 110 as the trolleys move along tracks 128 of boom 122a, 122b. Drum 162 is attached to upper support frames 169 of the trolleys. Drum 162 is rotatable by at least one motor (not shown) to wind or unwind cables 166 and adjust the vertical distance between the drum and mounting frame 168 and, thereby, raise and lower container support frame 108 attached to the mounting frame 168.

Reeving blocks 164a, 164b, 164c are attached to mounting frames 168 and to upper support frames 169. Cables 166a, 166b, 166c extend between drum 162 and mounting frame 168 and through reeving blocks 164a, 164b, 164c, 164d, 164e. Reeving blocks 164a rotate about a rotation axis parallel to a rotation axes of drums 162. Reeving blocks 164b, 164c rotate about a rotation axis perpendicular to the rotation axes of drums 162. Reeving blocks 164d, 164e rotate about a rotation axis skew (i.e., non-intersecting, non-parallel) to rotation axes of drums 162. Reeving blocks 164d are oriented in an opposite direction from reeving blocks 164e. Cables 166a extend from drum 162 and through reeving blocks 164a attached to upper support frame 169 and mounting frame 168. Cables 166a extend in a vertical direction between upper support frame 169 and mounting frame 168. Cables 166b extend from drum 162, through reeving blocks 164d attached to upper support frame 169, and around reeving blocks 164b attached to upper support frame 169 and mounting frame 168. Cables 166b extend at a first angle between upper support frame 169 and mounting frame 168. Cables 166c extend from drum 162, through reeving blocks 164e attached to upper support frame 169, and around reeving blocks 164c attached to upper support frame 169 and mounting frame 168. Cables 166c extend at a second angle between upper support frame 169 and mounting frame 168 and in an opposite direction from cables 166b.

Figure 15:
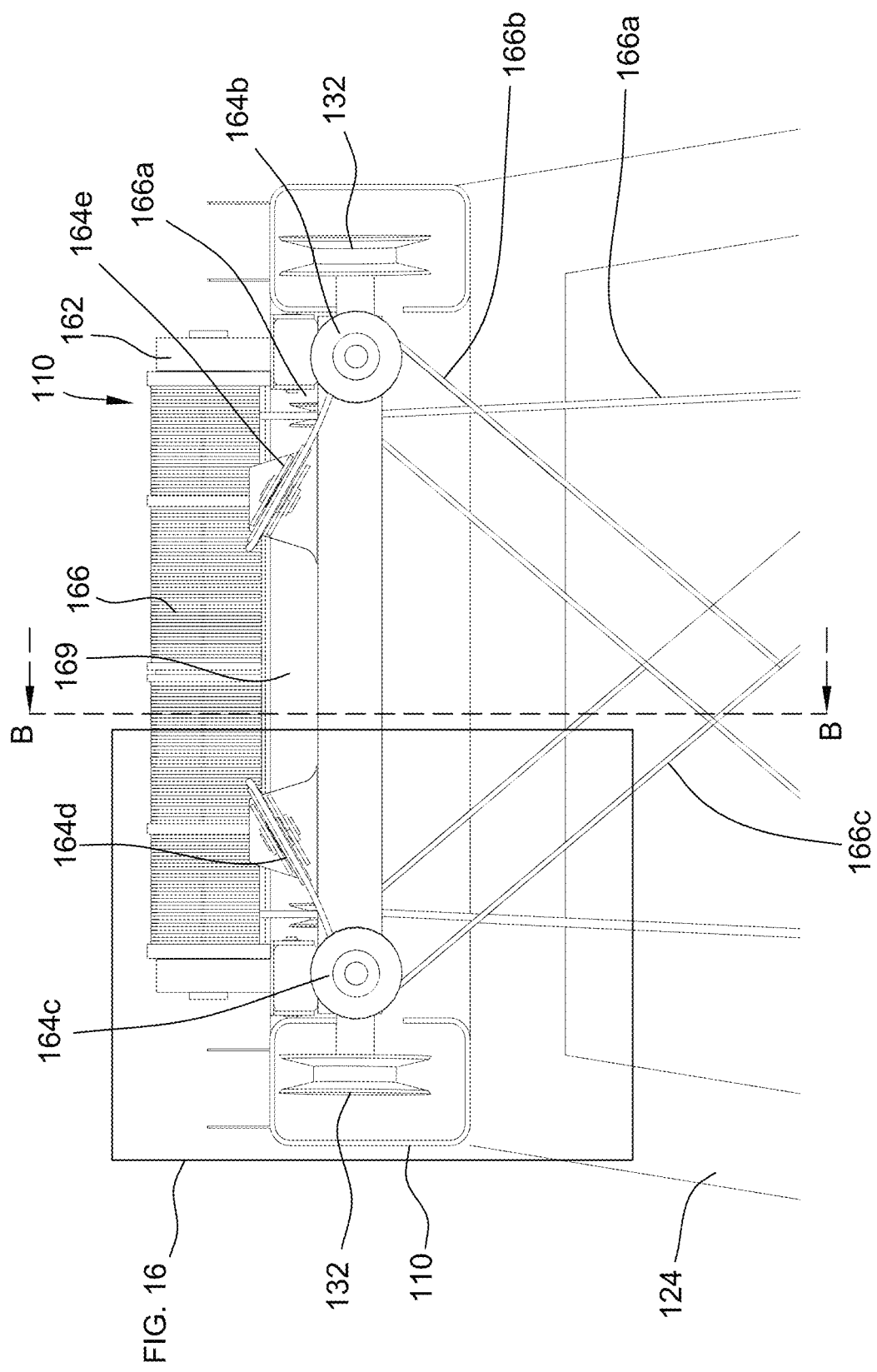
FIG. 15 is an enlarged front view of a portion of the hoist of the system shown in FIG. 12 within the rectangle identified as "FIG. 15" in FIG. 12, illustrating the hoist including a drum, reeve blocks, and cables wound onto the drum.
Figure 16:
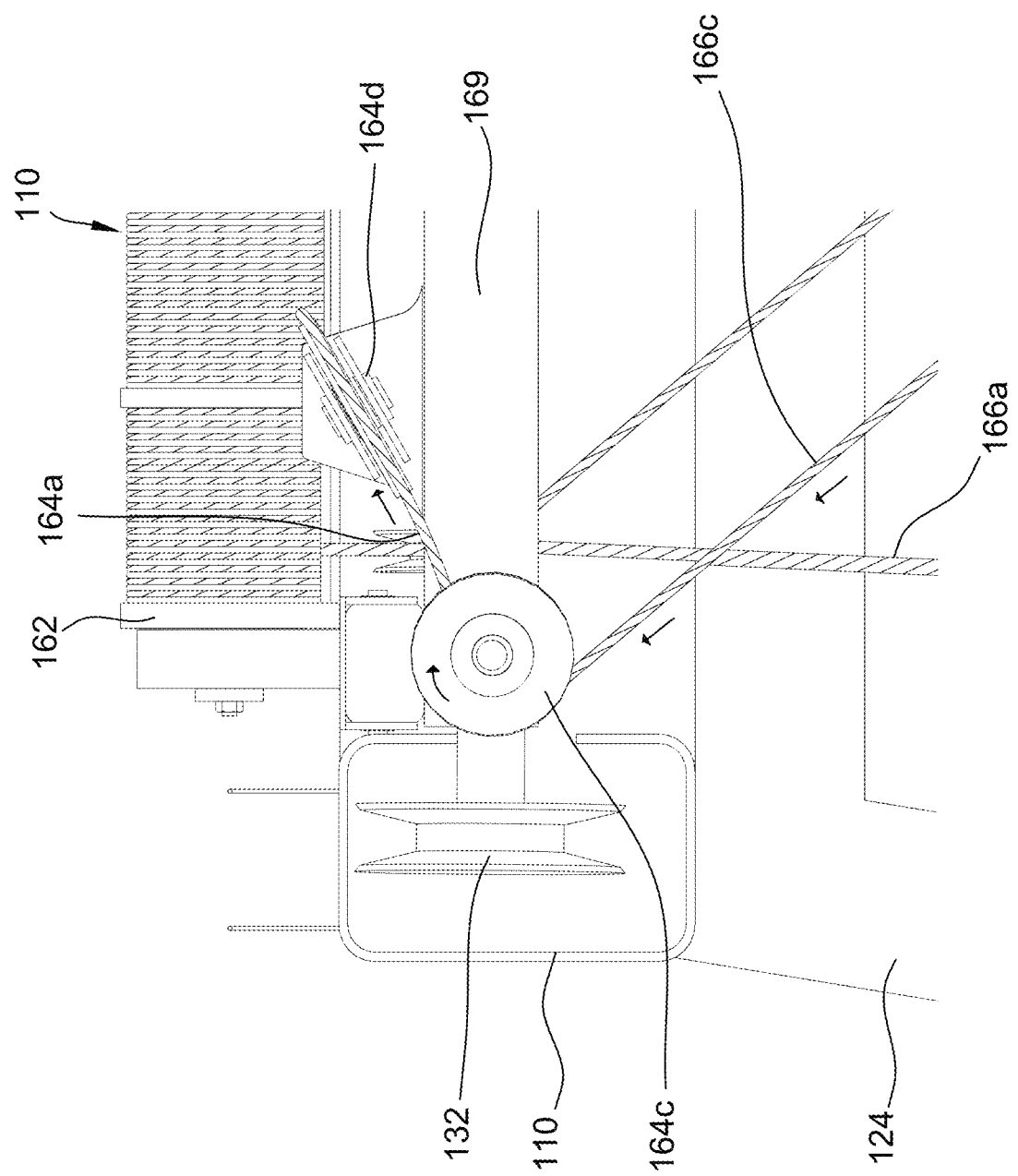
FIG. 16 is an enlarged front view of a portion of the system shown in FIG. 15 within the rectangle identified as "FIG. 16" in FIG. 15, illustrating reeve blocks of the hoist of the system.
Figure 17:
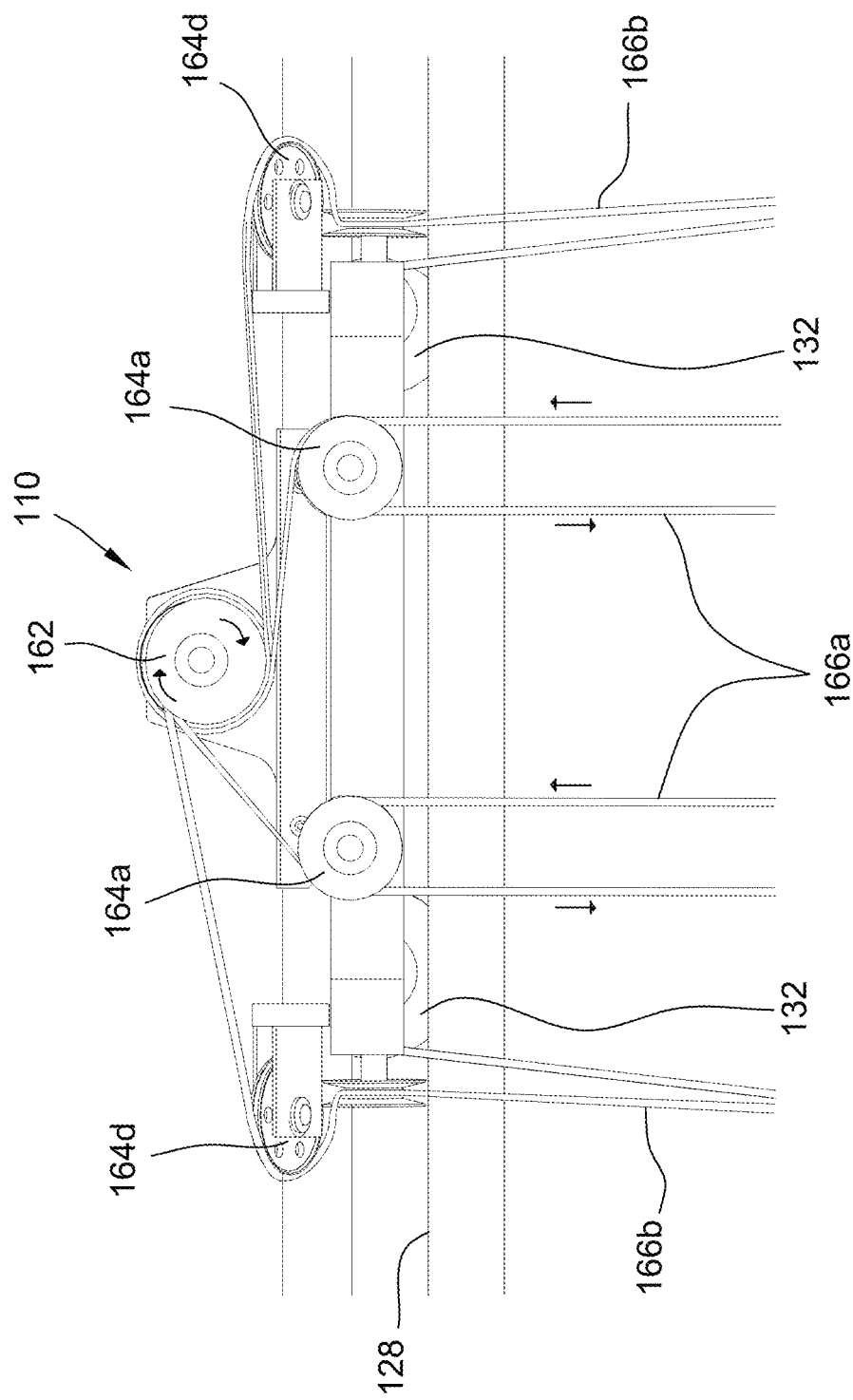
FIG. 17 is an enlarged sectional view of a portion of the system taken along line B-B shown in FIG. 15 and illustrating the cables extending through the reeve blocks and to the drum.

Referring to FIGS. 15-17, reeving blocks 164a, 164b, 164c, 164d, 164e guide cables 166 from drum 162 to mounting frame 168 and enable the cables to be re-directed from the direction the cables are released from the drum or are gathered around the drum to a direction about ninety degrees offset from the releasing and gathering directions. The reeving blocks each include at least one rotatable wheel 167 that receives cables 166 and allows the cables to move as the cables are wound or unwound on the drum. The reeving blocks direct the cables in multiple directions and at different angles relative to the direction of travel of trolley 126 and to the direction of movement of mounting frames 168 as container support frame 108 is raised and lowered. For example, each hoist 110 includes cables 166 that each are received by two or more reeving blocks 164 and extend in at least three different directions. In the illustrated embodiment, hoist 110 includes cables 166 connected to each side of each mounting frame 168. Cables 166a extend vertically in a direction parallel to the direction that the hoist 110 raises and lowers each mounting frame 168. Cables 166b, 166c extend at angles relative to the direction that the hoist 110 raises and lowers each mounting frame 168. Cables 166a, 166b, 166c are routed through reeving blocks 164 in the different directions. For example, cables 166b, 166c, which are oriented at an angle, are routed through reeving blocks 164b, 164c on offset corners of mounting frame 168 and upper support frame 169. Cables 166b, 166c are also routed through angled reeving blocks 164d, 164e on the upper support frame 169 that facilitate directing the cables 166 from the drums 162 into the corner reeving blocks. Cables 166a are routed through reeving blocks 164a on sides of mounting frame 168 and upper support frame 169. In other embodiments, the hoists 110 may include other reeving blocks 164 or cables 166 without departing from some aspects of the disclosure.

Cables 166a, 166b, 166c are individually controlled to adjust the distance between mounting frame 168 and drum 162 and to counteract forces on container support frame 108 as containers 102 are moved between vehicle 104 (shown in FIG. 1) and platform 106 (shown in FIG. 1). For example, drum 162 includes a plurality of sections that are connected to one or more motors. Each section receives one or more of the cables. The sections of drum 162 are rotatable to wind or unwind cables 166 separately on the sections of drum 162. Accordingly, drums 162 and reeving blocks 164 facilitate hoists 110 providing precise control of the movement of container support frame 108 and containers 102 when container support frame 108 and containers 102 are raised and lowered or moved between vehicle 104 and platform 106. In addition, hoist 110 is able to counteract forces on container support frame 108 and containers 102 during movement of container support frame 108 and containers 102. In some embodiments, system 100 includes an anti-sway system and predicts forces on the containers 102 and the container support frame 108 and adjusts the hoist 110 preemptively to prevent disruption of movement of the container support frame 108 and the containers 102.

The one or more hoists of system 100 facilitate the system moving at least five containers between vehicle 104 (shown in FIG. 1) and platform 106 (shown in FIG. 1). For example, hoists 110 can raise and lower an entire row of containers 102 secured to container support frame 108. System 100 is configured to accommodate forces on system 100 in different directions as containers 102 are moved between vehicle 104 and platform 106. Moreover, system 100 is configured to accommodate balancing and counteract forces if container support frame 108 is supporting less than a full row of the containers. In some embodiments, container support frame 108 supports a non-symmetrical, a non-uniform, or a symmetrical loading.

Figure 18:
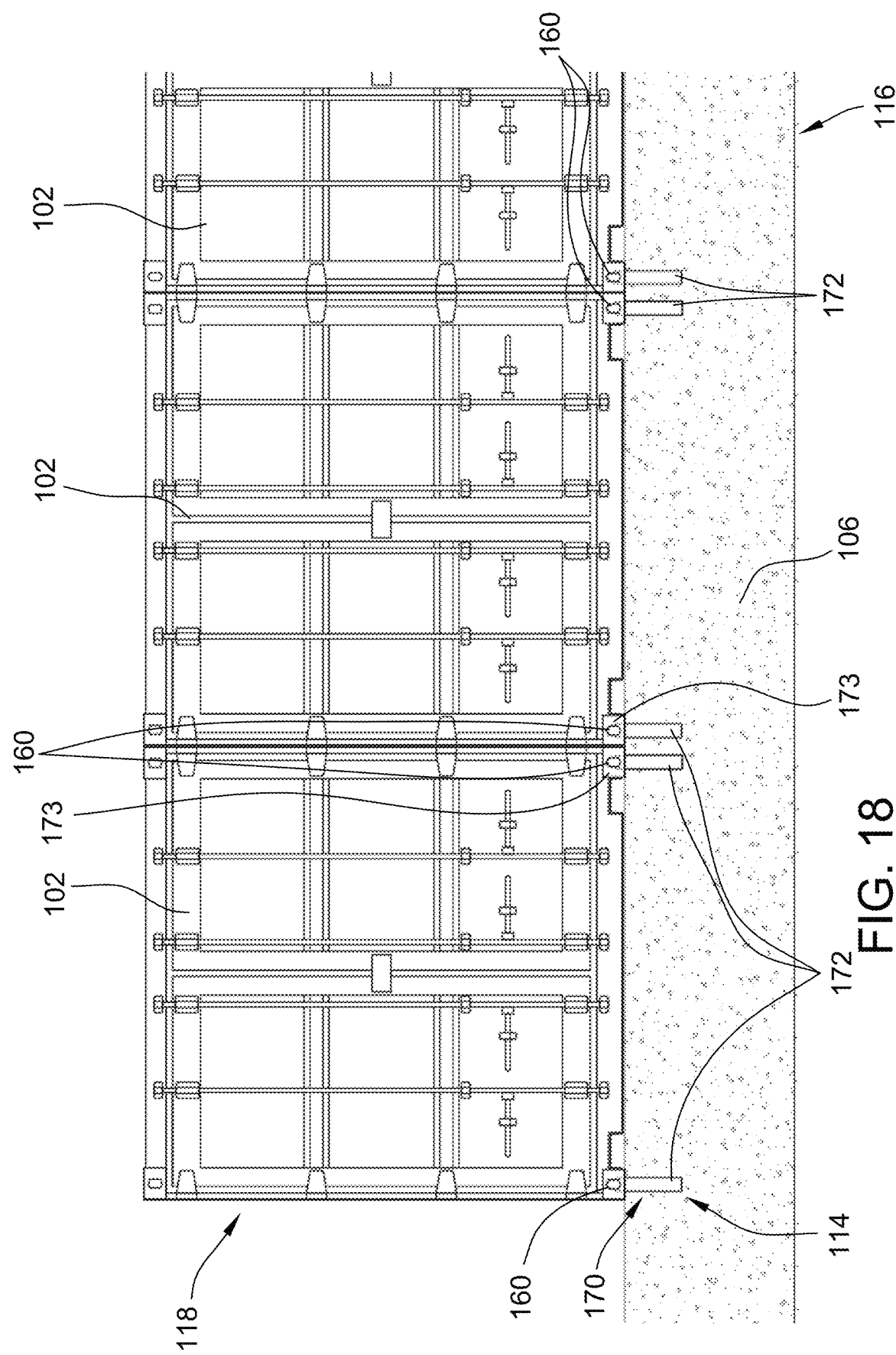
FIG. 18 is an enlarged end view of a portion of the containers positioned on the platform of the system within the rectangle identified as "FIG. 18" in FIG. 1, illustrating the system including an alignment device.
Figure 19:
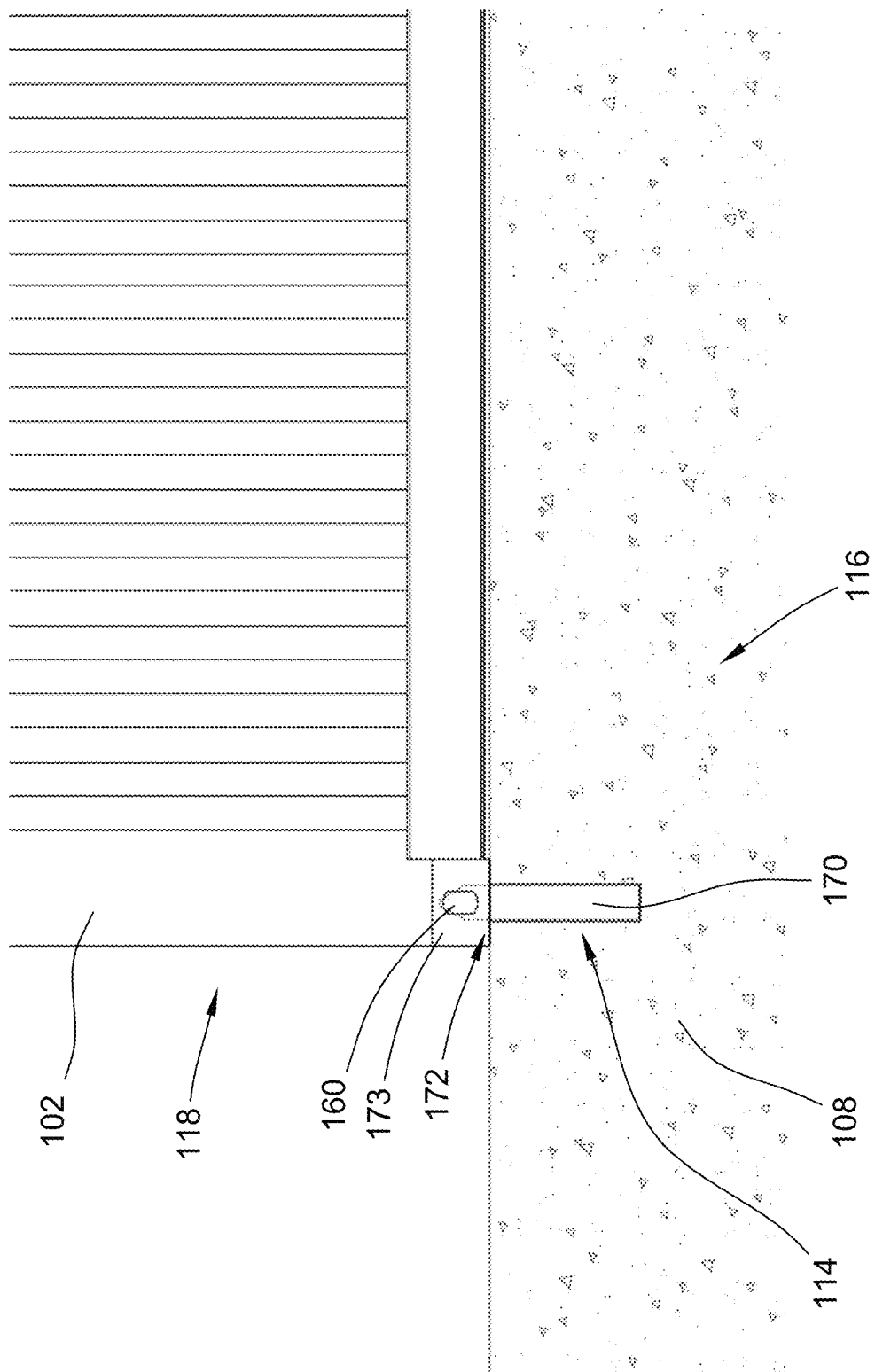
FIG. 19 is an enlarged side view of a portion of the containers and alignment device within the rectangle identified as "FIG. 19" in FIG. 1, illustrating the alignment device engaged with the containers.
Figure 20:
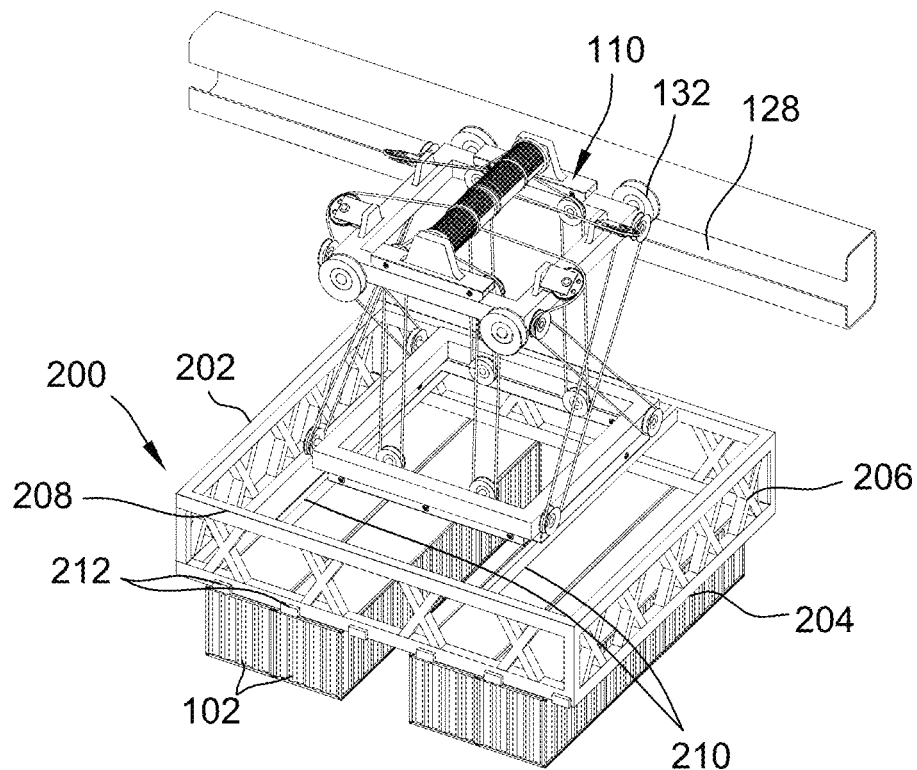
FIG. 20 is a perspective view of an embodiment of a portion of a system for moving containers between a vehicle and a platform, the system including a container support frame configured to support up to five containers.
Figure 21:
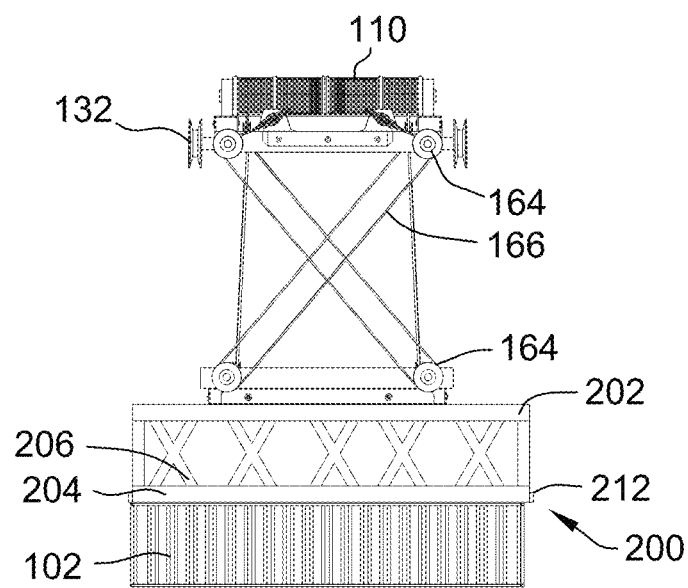
FIG. 21 is a side view of the system of FIG. 20.
Figure 22:
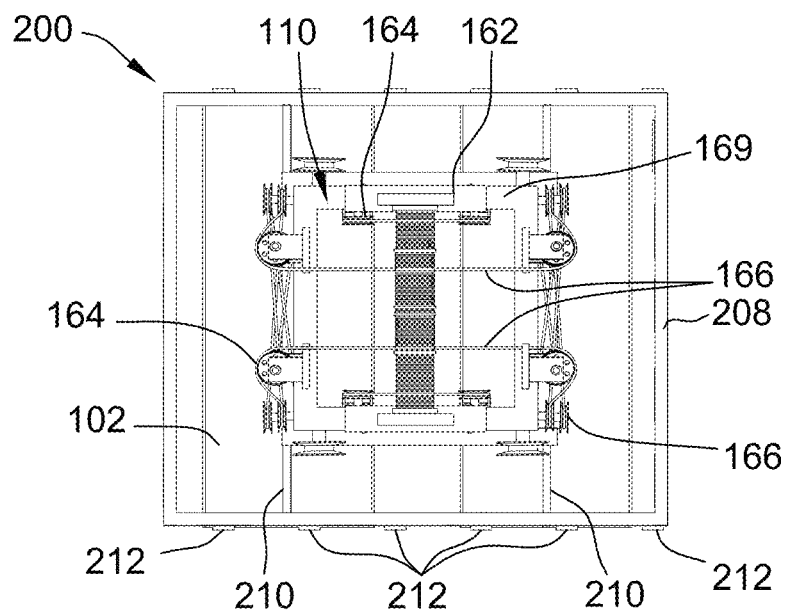
FIG. 22 is a top view of the system of FIG. 20.
Figure 23:
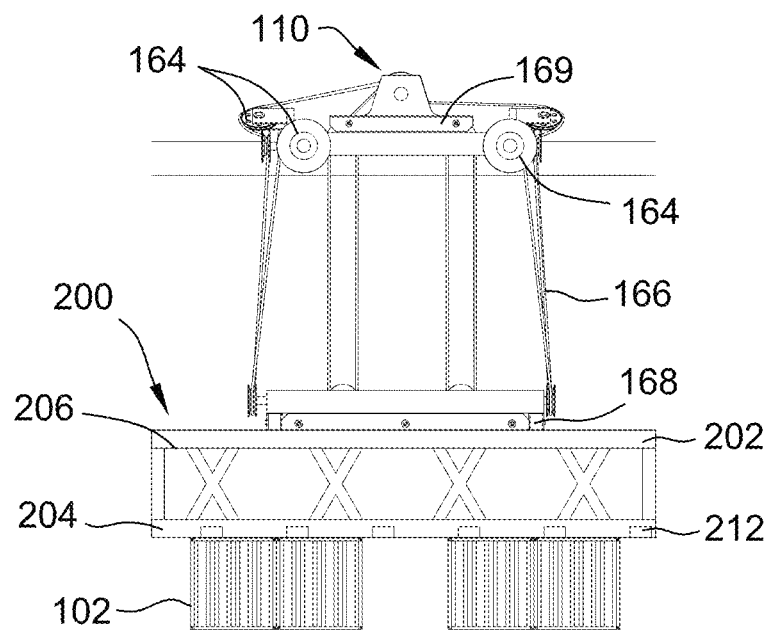
FIG. 23 is a front view of the system of FIG. 20.

Referring to FIGS. 18 and 19, one example of alignment system 114 of system 100 includes at least one alignment device 170 that is arranged to align containers 102 on vehicle 104 (shown in FIG. 1) or platform 106 in row 118. For example, in the illustrated embodiment, alignment devices 170 comprise a plurality of pegs 172 that have one end connected to container and a second end that is seated in the platform 106. Pegs 172 extend into container corner castings 173 to engage the containers 102. Pegs 172 are arranged in sets of four configured to engage each container 102 at the four corner castings 173 located at the lower container corners. Pegs 172 are removable from platform 106. Accordingly, pegs 172 can be rearranged to accommodate different sizes or arrangements of containers 102. The pegs are located in the container corner castings 173 and then four locked pegs are seated in recesses formed in platform 106 as shown in FIG. 18. In some embodiments, alignment system 114 does not include pegs 172 and includes any devices that facilitate alignment of the containers. For example, in some embodiments, alignment system 114 includes magnets, lasers, tracks, motorized apparatus or any other suitable alignment devices.

Alignment system 114 orients and aligns containers 102 in groups, such as rows 118, required for pickup and movement onto vehicle 104 by system 100. In addition, alignment system 114 facilitates system 100 positioning the containers in rows 118 when containers 102 are placed onto platform 106 from the vehicle by the container support frame. Rows 118 on the platform correspond to the orientation and positioning of the containers on the vehicle 104 (shown in FIG. 1). Accordingly, system 100 is able to quickly move the containers to load/unload between the vehicle and the platform. In addition, as a result of the system of the present disclosure, the containers do not need to be repositioned before or after the containers are moved and the system maintains the containers in a precise position for pickup by container support frame 108.

Referring again to FIGS. 1-6, during operation, system 100 is used to move the containers between the vehicle and the platform. The containers are arranged in rows 118 in a stacked arrangement on the vehicle and the platform. In some embodiments, containers 102 are arranged in the rows using alignment devices 170. In other embodiments, the containers are arranged in rows using motorized apparatus or any suitable alignment devices.

Conveyor 112 and hoist 110 position container support frame 108 above group 118 of containers 102. The containers are secured to container support frame 108 by connectors 144. In the illustrated embodiment, system 100 picks up and simultaneously moves an entire row 118. In the illustrated embodiment the group comprises 21 containers, which have a cumulative length substantially equal to the side-to-side dimension of vehicle 104.

Hoists 110 raise the container support frame and the group of containers connected to the frame above platform 106 and vehicle 104. When raising the load, drums 162 are rotated to wind cables 166 onto the drums. The cables are directed through the reeving blocks to raise the container support frame attached to mounting frame 168 toward boom 122 as cables 166 are wound onto drums 162.

When the container support frame and the containers are raised a predetermined distance above the platform and the vehicle, the conveyor moves the container support frame 108 and the group of containers supported by the frame. The trolleys are moved along track 128 with container support frame 108 maintained in the raised position. During container movement, the container support frame supports the container load and minimizes impacting the load as a result of torsional, bending loads the frame sustains during operation. The hoists adjust the cable tension to accommodate sway, wind, load displacement and other forces during movement.

When conveyor 112 is positioned above platform 106 or vehicle 104, hoists 110 lower container support frame 108 and the group of containers onto the platform or the vehicle. In the illustrated embodiments, container support frame 108 positions the containers on the platform in row 118. In some embodiments, the containers are lowered onto alignment devices 170 positioned on the platform. Once in place on the platform, the containers 102 are released from the container support frame by connectors 144 and the container support frame is then raised and conveyed back to the vehicle or the platform to pick up another row 118 of containers 102.

FIGS. 20-23 illustrate an embodiment of container support frame 200 for use with system 100 (shown in FIG. 1). The container support frame is configured to support up to five containers 102. The container support frame 200 includes a top 202, a bottom 204, and sides 206 extending between top 202 and bottom 204. Container support frame 200 is a hollow cube. Top 202 of container support frame 200 includes outer members 208 and cross members 210. Cross members 210 extend between outer members 208 and across the middle of container support frame 200.

Hoist 110 of system 100 is attached to cross members 210 of container support frame 200. In the example, container support frame 200 is raised and lowered by a single hoist 110. Container support frame 200 and containers 102 are moved by the conveyor 112 along the track 128 in the manner previously described.

The container support frame 200 includes connectors 212 that secure the containers to container support frame 200. In the illustrated embodiment, connectors 212 are mounted in sets along bottom 204 of container support frame 200. Accordingly, connectors 212 secure containers 102 to the bottom of the container support frame such that the containers are carried below the container support frame 200.

Figure 24:
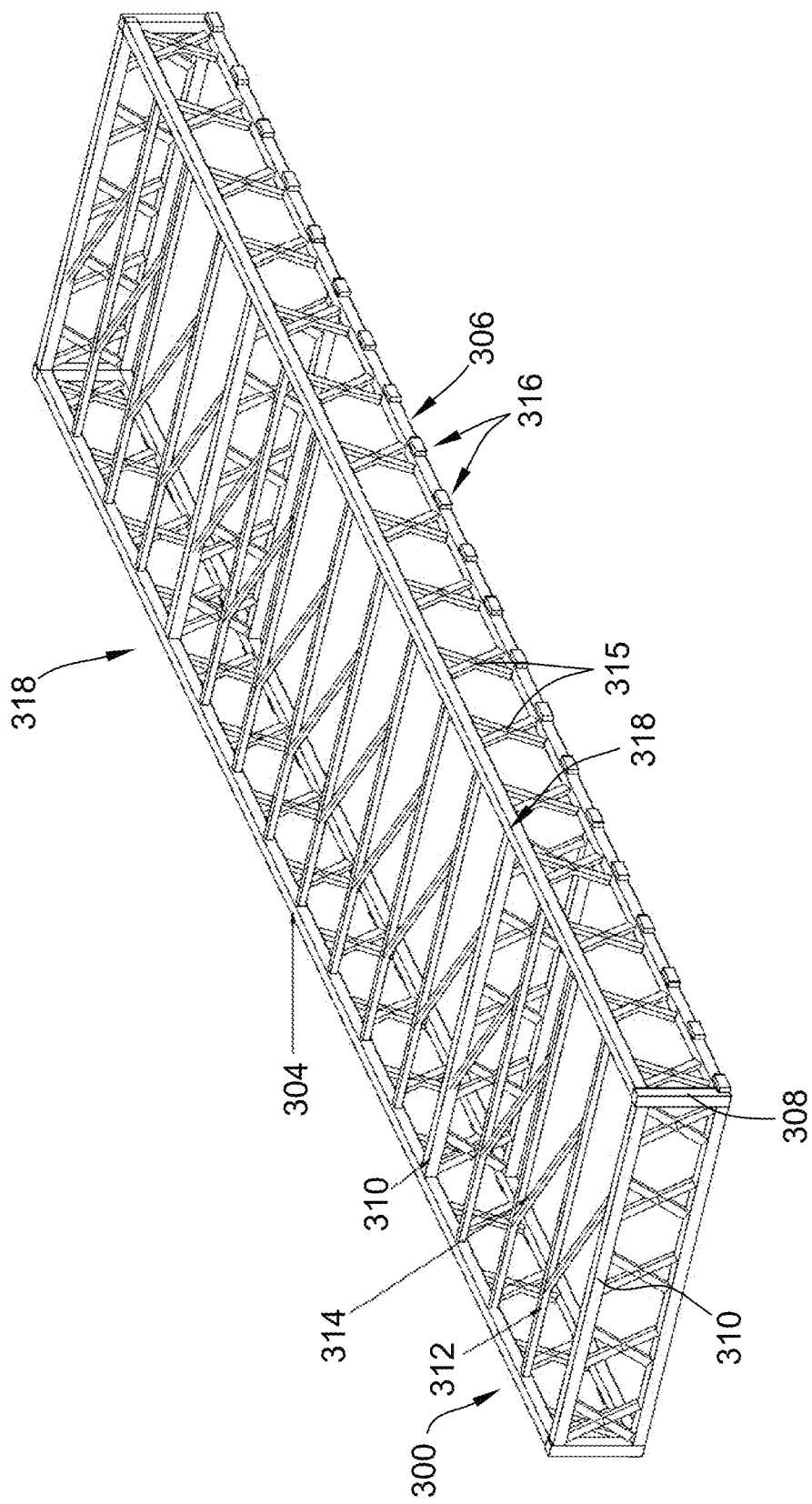
FIG. 24 is a perspective view of an embodiment of a container support frame for use with the system 100, the container support frame including transverse beams, horizontal lacers, and diagonal lacers.
Figure 25:
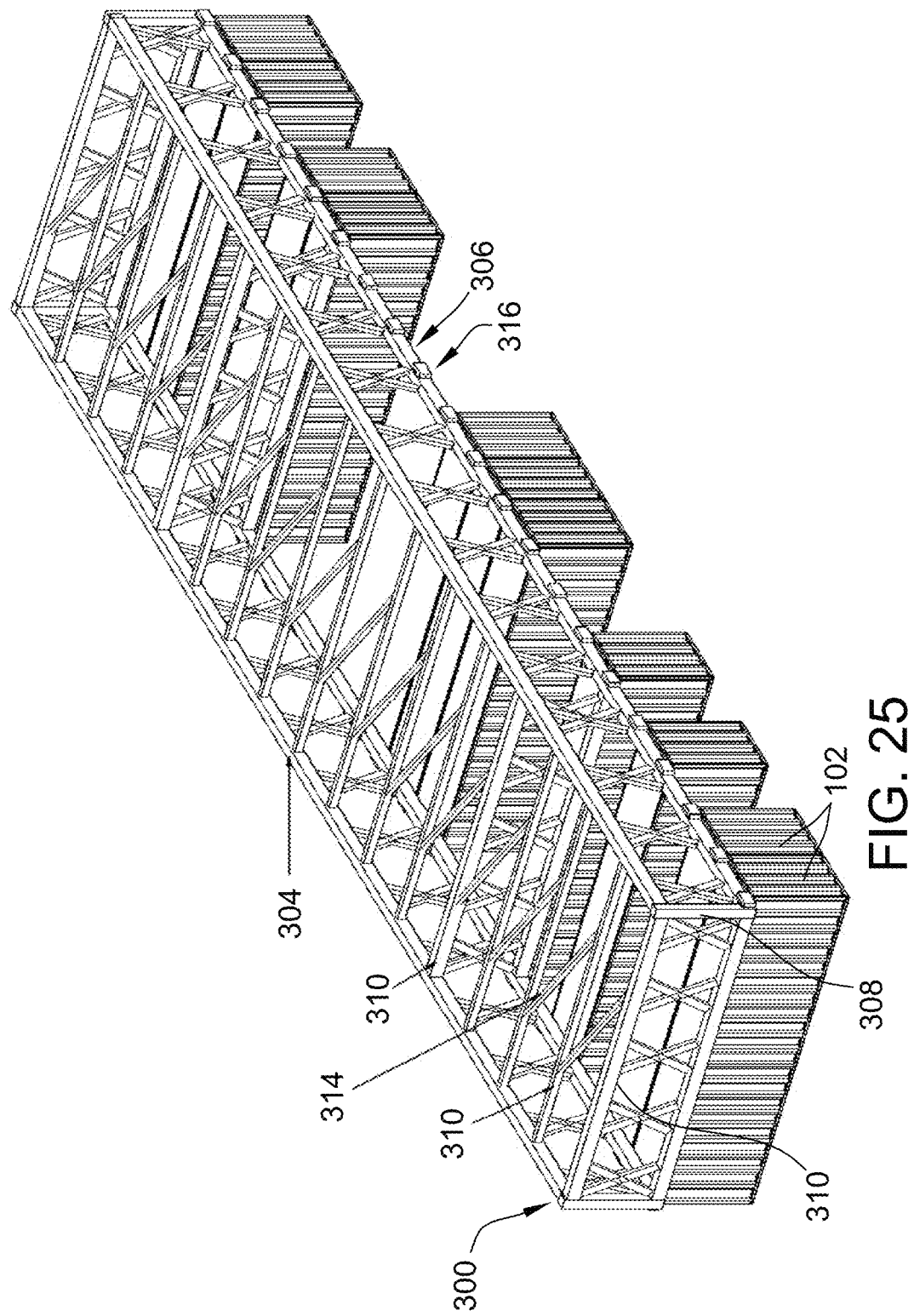
FIG. 25 is a perspective view of the container support frame of FIG. 24 with containers secured to the container support frame.

FIGS. 24 and 25 illustrate another embodiment of a container support frame 300 for use with system 100 (shown in FIG. 1). Container support frame 300 includes frame members 302 including top chords 304, bottom chords 306, corner posts 308, transverse beams 310, horizontal lacers 312, diagonal lacers 314, and cross bracing members 315.

Top chords 304 and bottom chords 306 extend from a first end to a second end of the container support frame 300. Horizontal lacers 312 and transverse beams 310 are perpendicular to chords 304, 306. Diagonal lacers 314 and cross bracing members 315 are oblique to top chords 304, bottom chords 306, horizontal lacers 314, and transverse beams 310. In the illustrated embodiment, frame members 302 form an open lattice having an overall rectangular cuboid shape. In other embodiments, frame members 302 are arranged in other shapes without departing from some aspects of the disclosure.

Embodiments of container support frames (e.g., container support frame 108, container support frame 200, and container support frame 300) are constructed to effectively lift and move a group of containers simultaneously and to resist forces on the containers during container movement. For example, frame members (e.g. structural members 148 of frame 108, members 208, 210 of frame 200, and frame members 302 of container support frame 300) resist forces on the container support frame in multiple directions as the container support frame and containers are moved. For example, transverse beams, horizontal lacers, and diagonal lacers resist twist forces on the container support frame.

Figure 26:
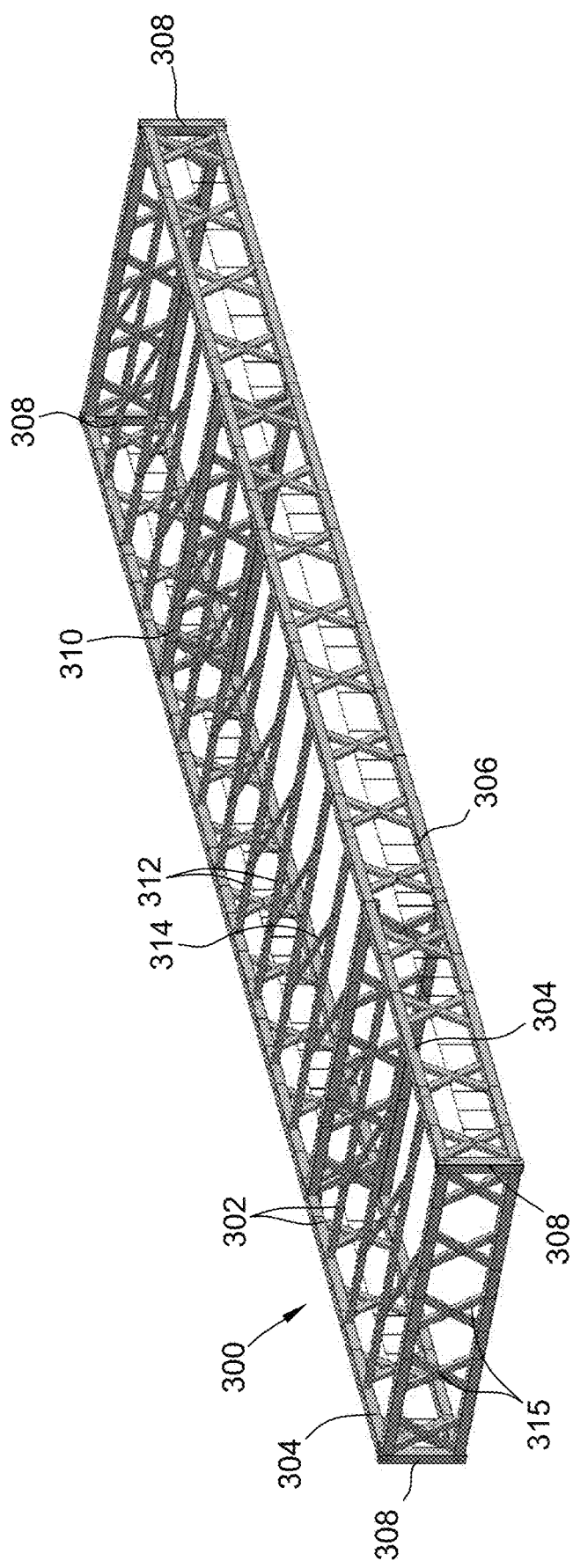
FIG. 26 is a force diagram of the container support frame of FIG. 24 illustrating modeled loads on the container support frame when the container support frame is used to move containers between a vehicle and a platform.
Figure 27:
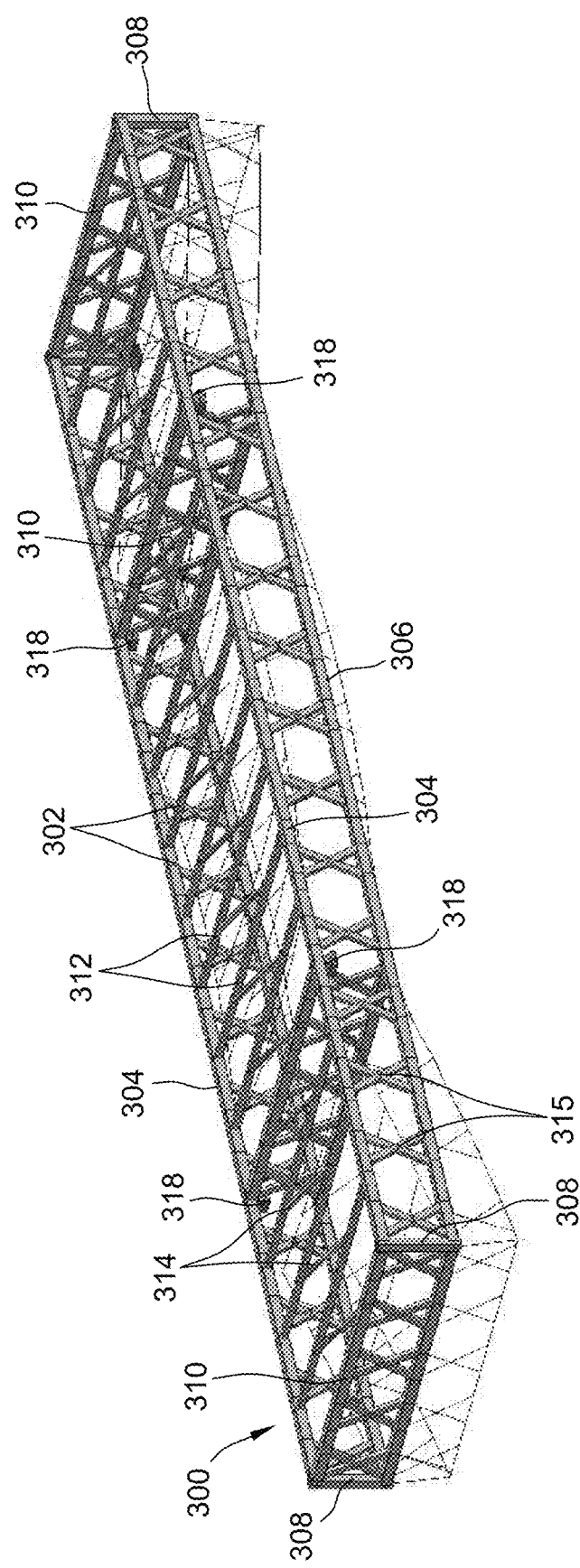
FIG. 27 is a perspective view of the container support frame of FIG. 26 with broken lines illustrating a deflected shape of the container support frame due to loading.

In the embodiment shown in FIGS. 26 and 27, container support frame 300 includes connectors 316 and is configured to support containers 102 secured to container support frame by connectors 316. Suitably, container support frame 300 is configured to support the containers when the containers are positioned in different arrangements and have different loadings. For example, as shown in FIG. 25, the container support frame 300 supports less than a full row 118 of the containers. Moreover, the containers are secured to the container support frame 300 in an asymmetric and unbalanced loading configuration. The frame members 302 of the container support frame 300 accommodate uneven loading during movement.

FIG. 26 is a force diagram of container support frame 300 illustrating modeled loads on the container support frame 300 when, for example, the container support frame is used to move containers 102 between vehicle 104 and platform 106. In the illustrated embodiment, the loading of the container support frame is substantially uniform along the length of the container support frame (i.e., the container support frame experiences uniformly distributed loading (UDL)). For example, the containers are spaced evenly along the length and each containers has a load that is equal to the load of other containers. In other embodiments, the loading may be non-uniform (i.e., a varying distributed loading). For example, the containers may be unevenly spaced along the length of container support frame 300, container support frame 300 may carry less than a full load of containers, and/or the containers each may have different loads.

Figure 28:
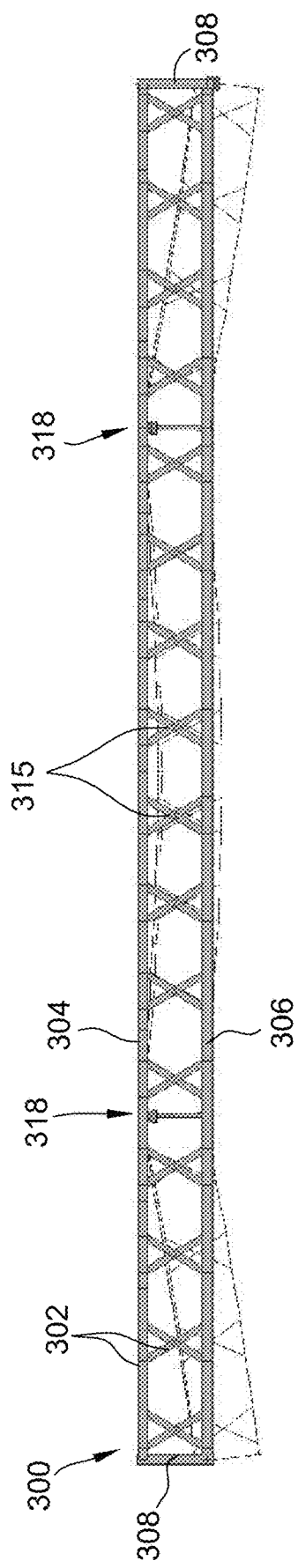
FIG. 28 is a side view of the container support frame of FIG. 26 with broken lines illustrating a deflected shape of the container support frame due to loading.

FIG. 27 is a perspective view of container support frame 300 with broken lines illustrating a deflected shape of the container support frame due to the loading. FIG. 28 is a side view of container support frame 300 with broken lines illustrating a deflected shape of the container support frame due to loading. The container support frame is supported by a hoist (e.g. hoist 110 shown in FIG. 1) at pick or support points 318. The pick points are fixed in location. The container support frame deflects downward at the ends and in the middle of the container support frame between the pick points.

The container support frame 300 is constructed to accommodate the deflection and facilitate container support frame 300 supporting a group of containers typically comprising 5-25 containers. For example, container support frame 300 includes frame members 302 that extend in different directions and form an open frame structure. Frame members 302 resist forces in multiple directions and distribute the load throughout the length of container support frame 300 to accommodate deflection, resist twist, and maintain support of the containers during movement.

Figure 29:
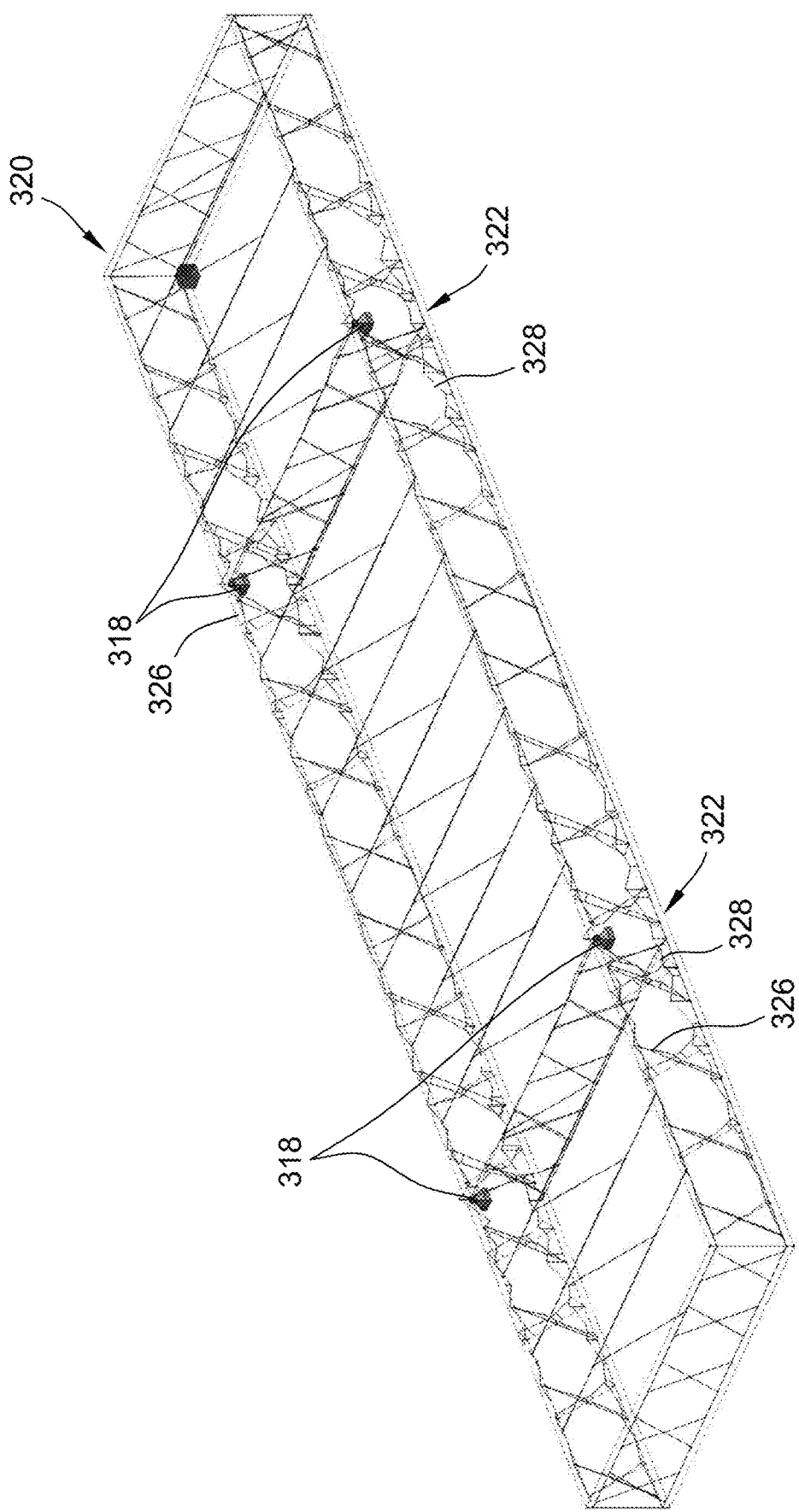
FIG. 29 is a perspective view of a schematic wire frame representation of the container support frame of FIG. 26 illustrating stress concentrations and magnitudes in the container support frame due to loading.
Figure 30:
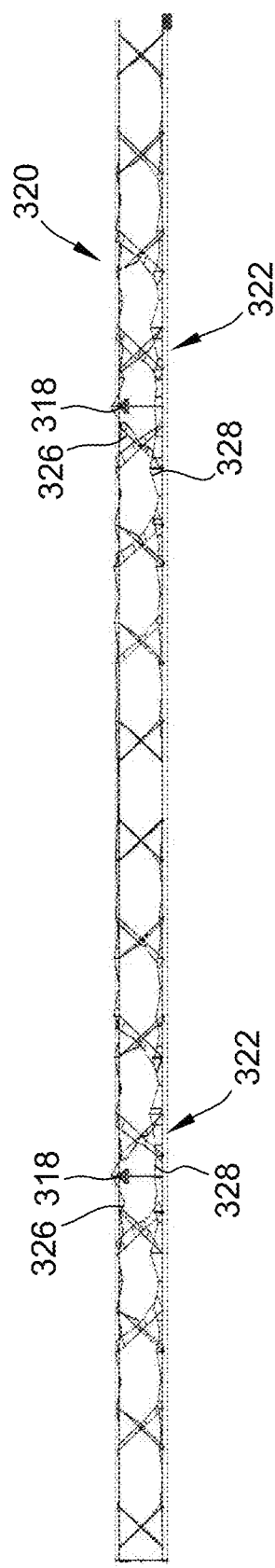
FIG. 30 is a side view of the wire frame representation of FIG. 29 illustrating stress concentrations and magnitudes in the container support frame due to loading.

FIG. 29 is a perspective view of a schematic wire frame representation 320 of container support frame 300 (shown in FIG. 26) illustrating stress concentrations 322 in container support frame 300 due to loading. FIG. 30 is a side view of wire frame representation 320. Stress concentrations 322 include tensile stresses 326 and compression stresses 328. For example, bottom chords 306 experience compression stresses 328 with a maximum stress proximate pick points 318. The pick points 318 are connection points to a support or hoist and are therefore fixed support points for the container support frame 300. Stresses are concentrated at the pick points due to the rigidity of the container support frame 300 in the regions of the pick points.

The cross bracing members 315 transfer forces between chords 304, 306. Cross bracing members 315 experience tensile stresses 326 or compression stresses 328 based on the orientation of the cross bracing members 315. In the example, cross bracing members 315 are arranged in pairs that are oriented oppositely and, thus, receive opposite tensile and compression stresses 326, 328.

Figure 31:
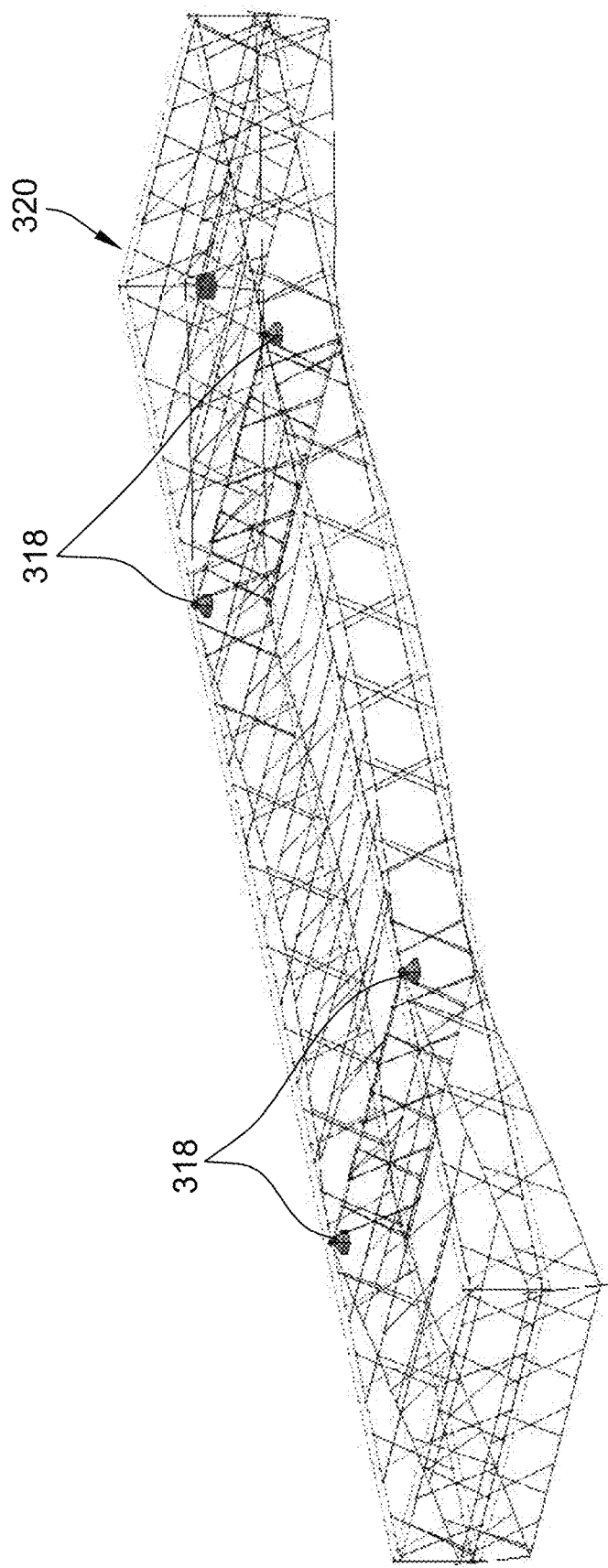
FIG. 31 is a perspective view of the wire frame representation of FIG. 29 with broken lines illustrating a deflected shape of the container support frame due to loading.
Figures 32, 33:
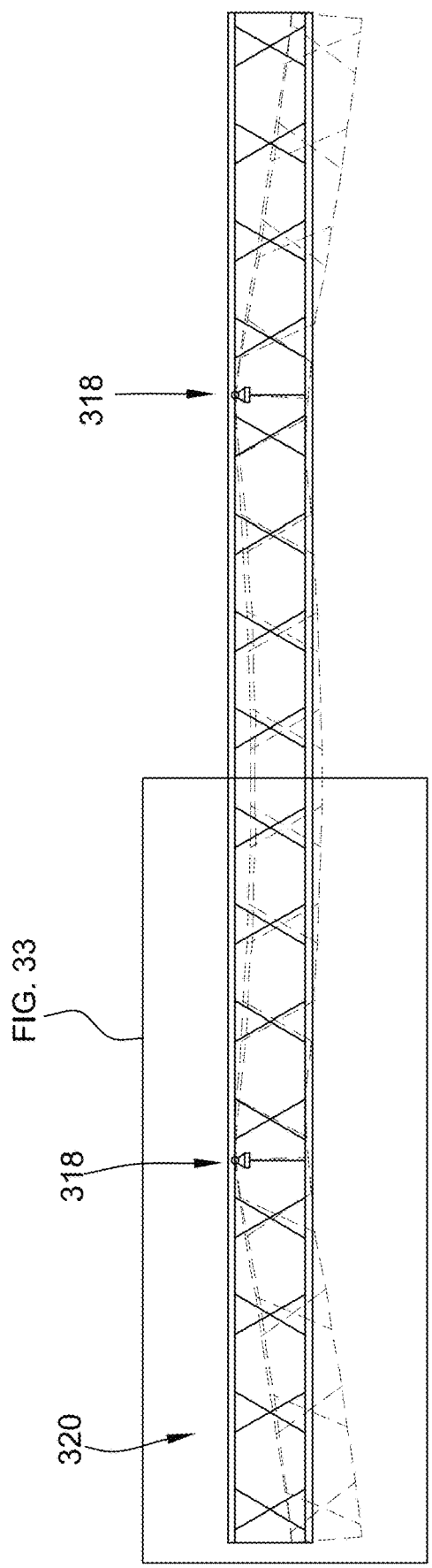
FIG. 32 is a side view of the wire frame representation of FIG. 29 with broken lines illustrating a deflected shape of the container support frame due to loading.
FIG. 33 is an enlarged side view of a portion of the wire frame representation indicated by the box in FIG. 32 with broken lines illustrating a deflected shape of the container support frame around a support point of the container support frame in the disclosed embodiment.
Figure 33:
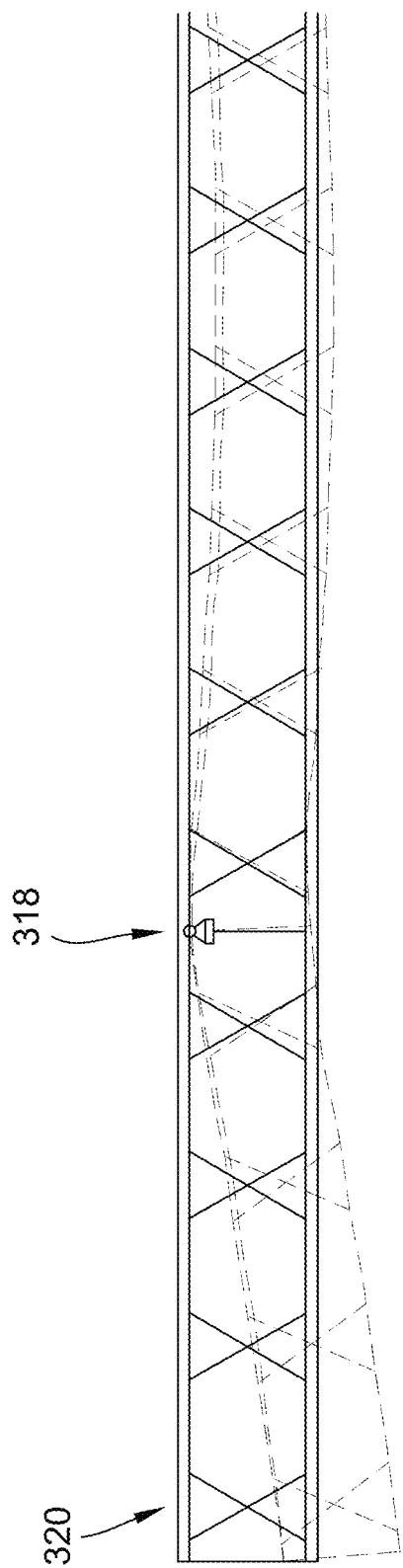

FIG. 31 is a perspective view of wire frame representation 320 illustrating a deflected shape of container support frame 300 (shown in FIG. 26) due to loading. FIG. 32 is a side view of wire frame representation 320 with broken lines illustrating a deflected shape of container support frame 300 due to loading. FIG. 33 is an enlarged side view of a portion of wire frame representation 320.

Referring to FIGS. 29-33, wire frame representation 320 indicates that the greatest tensile and compression stresses 326, 328 occurs at the fixed support regions of container support frame 300 where loads are resolved. For example, container support frame 300 deflects in regions proximate pick points 318. The largest deflection and lowest stress concentrations occur at the free ends of the container support frame. Container support frame 300 may have varying stress concentrations and deflections when container support frame 300 experiences varying loadings from static and/or dynamic forces. Suitably, container support frame 300 includes frame members 302 throughout the length of the container support frame 300 that extend in different directions and are configured to support different loadings of container support frame 300. In the example, container support frame 300 is symmetric about axes extending through a center of container support frame 300. Container support frame 300 is constructed to support at least five containers and accommodate the deflection and associated tensile and compression stresses 326, 328. Container support frame 108 and container support frame 200 are constructed to support at least five containers and accommodate the deflection in a manner similar to container support frame 300. In this way the system 100 and associated frames 108, 200 and 300 support the loads created by the large number of containers moved between the platform and vehicle to dramatically simplify vehicle loading relative to existing loading systems.

Embodiments of the systems and methods described herein are configured to move a group of containers (e.g., 5-25 containers) between a vehicle and a platform and resist forces on the containers during movement to facilitate the containers being safely and quickly moved between the vehicle and the platform. The systems and methods move an entire row of the containers simultaneously. Accordingly, the containers do not need to be rearranged prior to or after the containers are picked up.

When introducing elements of the present disclosure or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. A system for moving containers between a vehicle and a platform, each container having a top, the system comprising:
    a container support frame including a bottom, a first end, a second end, and at least one structural member extending from the first end to the second end, the container support frame having a longitudinal axis extending through the first end and the second end;
    connector housings mounted along the bottom of the container support frame between the first end and the second end, wherein the container support frame is configured to support a group of containers secured to the container support frame at the connector housings, wherein the container support frame is only secured to the containers along the tops of the containers, wherein the group of containers comprises at least five containers arranged in a row side-by-side along the longitudinal axis of the container support frame and supported directly below the container support frame;
    a hoist configured to raise and lower the container support frame and the at least five containers when the containers are secured to the container support frame; and
    a conveyor configured to move the container support frame and the at least five containers between the vehicle and the platform.

2. A system of claim 1, wherein the group of containers comprises five to twenty-five containers.

3. A system of claim 1, wherein the container support frame comprises a plurality of structural members forming an open lattice.

4. A system of claim 3, wherein the structural members extend in at least three different directions and are arranged to resist bending and twist forces experienced by the container support frame as the container support frame and the containers are moved by the hoist and the conveyor.

5. A system of claim 1 further comprising at least one alignment device that engages a container of the group of containers and is arranged to align the group of containers in a row on the platform, wherein the connector housings are arranged for securement of the containers in the row to the container support frame, wherein the at least one alignment device is movable on the platform to a location, the at least one alignment device engages the container at the location to position the container in the row.

6. A system of claim 5, wherein the at least one alignment device comprises at least one of a peg, a magnet, a laser, a track, and a motorized apparatus.

7. A system of claim 1, wherein the container support frame includes a top and sides extending between the first end and the second end, the connector housings are mounted along the bottom of the container support frame to secure the containers below the container support frame as the hoist raises and lowers the container support frame, wherein the sides include cross-bracing extending between the top and the bottom.

8. A system of claim 1, wherein the container support frame has a length defined from the first end to the second end, the length is at least 40 feet.

9. A system of claim 1, wherein the container support frame includes sides extending between the first end and the second end, wherein the container support frame has a width defined between the sides, the width is at least 20 ft.

10. A system of claim 1, wherein the vehicle is a ship including a cargo space having a width sized to receive the group of containers, the group of containers arranged across the width of the cargo space.

11. A system of claim 1, wherein each container of the group of containers has a longitudinal axis, and wherein the group of containers are secured to the container support frame in a side-by-side arrangement such that the longitudinal axis of each container is perpendicular to the longitudinal axis of the container support frame.

12. A system of claim 1, wherein the group of containers comprises at least twenty containers.

13. A system of claim 1, wherein the conveyor include legs and a boom, and wherein the boom extends between the legs and has a longitudinal axis that is parallel to the longitudinal axis of the container support frame, wherein the conveyor is configured to move the container support frame and the containers between the platform and the vehicle in a direction parallel to the longitudinal axis of the container support frame.

14. A system of claim 13, wherein the conveyor includes at least two pairs of the legs, wherein a first pair of legs is disposed on a first side of the vehicle and wherein a second pairs of leg is located on a second side of the vehicle.

15. A method for moving containers between a vehicle and a platform, each container having a top, the method comprising:
    securing a group of containers to a bottom of a container support frame, wherein the group of containers comprises at least five containers arranged in a row and supported directly below the container support frame, wherein the container support frame is only secured to the containers along the tops of the containers;
    raising the container support frame and the at least five containers above the platform and the vehicle;
    moving the container support frame and the at least five containers between the platform and the vehicle; and
    lowering the at least five containers onto the platform or the vehicle.

16. A method of claim 15, wherein securing the group of containers to the container support frame comprises securing the group of containers to the container support frame using sets of connector housings, wherein each set of connector housings is arranged to secure at least one container to the container support frame.

17. A method of claim 15, wherein securing the group of containers to the container support frame comprises securing a group of five to twenty-five containers to the container support frame.

18. A method of claim 15 further comprising aligning the group of containers in a row on the vehicle or the platform.

19. A method of claim 18 further comprising aligning the container support frame and the row of containers, wherein the container support frame is arranged to engage the containers in the row.

20. A system comprising:
a container support frame including a bottom and configured to engage a group of containers in a row on a platform or a vehicle, wherein the group of containers comprises at least five containers arranged in a row and supported directly below the container support frame, wherein the container support frame includes connector housings that are mounted along the bottom of the container support frame and arranged to secure the containers in the row to the container support frame;
a hoist configured to raise and lower the container support frame and the at least five containers; and
a conveyor comprising at least two trolleys that support at least a portion of the hoist and are configured to move the container support frame and the at least five containers between the platform and the vehicle.

21. A system of claim 20, wherein the group of containers comprises five to twenty-five containers.

22. A system of claim 20, wherein the container support frame comprises a plurality of structural members forming an open lattice, wherein the structural members extend in at least three different directions and are arranged to resist bending and twist forces experienced by the container support frame as the container support frame and the group of containers are moved by the hoist and the conveyor.

23. A system of claim 22, wherein the container support frame includes a first end, a second end, a top, and sides extending between the first end and the second end, wherein the container support frame is configured to support the containers below the bottom of the container support frame as the hoist raises and lowers the container support frame, wherein the sides include cross-bracing extending between the top and the bottom.

24. A system of claim 20, wherein the container support frame includes a first end and a second end, wherein the container support frame has a length defined from the first end to the second end, the length is at least 40 feet.

25. A system of claim 20, wherein the container support frame includes a first end, a second end, and sides extending between the first end and the second end, wherein the container support frame has a width defined between the sides, the width is at least 20 ft.

26. A system of claim 20 further comprising an alignment device that engages a container of the group of containers and is configured to align the group of containers in the row on the platform, wherein the alignment device is movable on the platform to a location, the alignment device engages the container at the location to position the container in the row.

27. A system for moving containers between a ship and a platform, the ship including a cargo space having a width sized to receive a group of containers, the group of containers comprising five to twenty five containers arranged in a row to span the width of the cargo space, the system comprising:
a container support frame configured to secure to and support the group of containers directly below the container support frame; and
a conveyor comprising at least two trolleys coupled to the container support frame and configured to move the group of containers simultaneously between the ship and the platform.

28. A system of claim 27, wherein the container support frame comprises a plurality of structural members forming an open lattice.

29. A system of claim 28, wherein the structural members extend in at least three different directions and are arranged to resist bending and twist forces experienced by the container support frame as the container support frame and the containers are moved by the system.

30. A system of claim 27 further comprising at least one alignment device that engages a container of the group of containers and is arranged to align the group of containers in a row on the platform, wherein the at least one alignment device is movable on the platform to a location, the at least one alignment device engages the container at the location to position the container in the row.

31. A system of claim 27 further comprising a container support frame including a top, a bottom, and sides extending between a first end and a second end, the container support frame further comprises connector housings mounted along the bottom of the container support frame to secure the containers below the container support frame as the system raises and lowers the container support frame.

32. A system of claim 27 further comprising a container support frame including a first end, a second end, and sides extending between the first end and the second end, wherein the container support frame has a length defined from the first end to the second end and a width defined between the sides, the length is at least 40 feet, the width is at least 20 ft.

* * * * *